(12) United States Patent
Leduc

(10) Patent No.: US 6,675,351 B1
(45) Date of Patent: Jan. 6, 2004

(54) TABLE LAYOUT FOR A SMALL FOOTPRINT DEVICE

(75) Inventor: Kevin Leduc, Ottawa (CA)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/333,331

(22) Filed: Jun. 15, 1999

(51) Int. Cl.⁷ .......................... G06F 15/00; G06F 17/00
(52) U.S. Cl. .................. 715/503; 715/509; 715/517
(58) Field of Search .................. 707/503, 509, 707/517; 715/503, 505, 517

(56) References Cited

U.S. PATENT DOCUMENTS

| | | | | |
|---|---|---|---|---|
| 5,450,536 A | * | 9/1995 | Rosenberg et al. | 707/509 |
| 5,588,099 A | * | 12/1996 | Mogilevsky et al. | 707/508 |
| 5,970,506 A | * | 10/1999 | Kiyan et al. | 707/503 |
| 6,044,383 A | * | 3/2000 | Suzuki et al. | 707/504 |
| 6,055,550 A | * | 4/2000 | Wallack | 707/509 |
| 6,065,012 A | * | 5/2000 | Balsara et al. | 345/839 |
| 6,085,202 A | * | 7/2000 | Rao et al. | 345/440 |
| 6,088,708 A | * | 7/2000 | Burch et al. | 707/509 |
| 6,311,196 B1 | * | 10/2001 | Arora et al. | 345/764 |
| 6,326,970 B1 | * | 12/2001 | Mott et al. | 345/667 |
| 6,336,124 B1 | * | 1/2002 | Alam et al. | 707/523 |
| 6,415,278 B1 | * | 7/2002 | Sweet et al. | 707/2 |

OTHER PUBLICATIONS

Jini™ Architecture Specification, © 1999 Sun Microsystems, Inc., pp. 1–21.

Raggett, memo defining an experimental protocol for the Internet community, May 1996, pp. 1–24.

* cited by examiner

*Primary Examiner*—Sanjiv Shah
*Assistant Examiner*—Almari Yuan
(74) *Attorney, Agent, or Firm*—Meyertons Hood Kivlin Kowert & Goetzel, P.C.; B. Noel Kivlin

(57) ABSTRACT

An efficient method is described for laying out a table for display. The method may be used to display tables on a small footprint device, such as a smart cellular phone, a personal data assistant, a handheld computer, etc. Small footprint devices typically have smaller displays than other computing systems such as desktop computers. In one embodiment the method is employed to lay out HTML tables in a web browser running on a small footprint device.

18 Claims, 20 Drawing Sheets

| Row 0, Column 0 | Row 0, Column 1 | Row 0, Column 2 | | |
|---|---|---|---|---|
| Row 1, Column 0 | Row 1, Column 1 | Row 1, Column 2 Nested table: | Row 0, Column 0 | Row 0, Column 1 |
| | | | Row 1, Column 0 | Row 1, Column 1 |
| Row 2, Column 0 | Row 2, Column 1 | Row 2, Column 2 | | |

Device Display

FIG. 9

TABLE LAYOUT FOR A SMALL FOOTPRINT DEVICE

BACKGROUND OF THE INVENTION

1. Field of the Invention

This invention relates generally to computer table data structures and small footprint devices. More particularly, the invention relates to parsing and laying out a table for display, e.g., parsing and laying out an HTML table for display in a web browser running on a small footprint device.

2. Description of the Related Art

The field of "smart" small footprint devices is growing and changing rapidly. Small footprint devices include handheld computers, personal data assistants (PDAs), cellular phones, global positioning system (GPS) receivers, game consoles, and many more such devices. These devices are becoming more intelligent and interconnected. Technologies such as Jini™ from Sun Microsystems, Inc. and initiatives such as the Open Service Gateway Initiative (OSGI) are expanding the traditional concepts of computer networks to include small footprint devices.

This increased device interconnection has introduced a need for both new types of computing services and new ways to integrate computing services, both inter-device-based and intra-device-based services. A "service" is an entity implemented within or accessible from a device that can be used by a person, an application, or another service. The concept of a service is broad and can be considered at many different scales. For example, services include familiar network-based services such as shared printing, email, telephony, etc. Services also include less familiar examples such as an energy management service which may control the power consumption of devices within a local network, a diagnostic service which allows a device to send information to a service technician when an error occurs, a health-monitoring service which immediately notifies health professionals of an emergency, etc.

Services also include modules or applications located and executable within a local machine or device. For example, local application programs may utilize a service to communicate with an HTTP server, an HTML render engine service, a bookmark service, a user interface service, etc. In this example, an application program may use these services together to implement a web browser program.

It is becoming more common today to execute multiple services and applications together in a single small footprint device. However, since memory, processing power, and other resources are typically very limited in small footprint devices, a specialized lightweight service/application containment framework is necessary to achieve the desired integration of services and applications. It is also desirable that the containment framework be flexible and extendable enough to provide a framework for any types of services and applications for any kind of small footprint device. A further goal may be that the containment framework be compatible and integrated with off-device services such as services available to devices in a Jini™ network. The containment framework described herein achieves the above-stated goals.

The lightweight containment framework may enable small footprint devices such as personal data assistants, smart cellular phones, etc. to run the types of multi-purpose application programs traditionally associated with desktop computing environments. For example, the Personal Applications suite available from Sun Microsystems, Inc. is built around one embodiment of the containment framework. The Personal Applications suite comprises an integrated set of compact, memory-efficient applications, including the Personal Applications Browser, the Personal Applications Email Client, and the Personal Organizer.

Since small footprint devices may have very strong resource constraints, it is important that not only the application and service framework be lightweight, but also that the applications and services themselves be as compact and efficient as possible. Tables are commonly used in many types of application programs. For example, web browsers display HTML tables, word processors display tables in documents, etc. A table may comprise rows and columns, where the rows and columns define cells, and each of the cells may comprise some kind of cell content. The present invention addresses the problem of laying out table data structures for display.

SUMMARY OF THE INVENTION

An efficient method is described for laying out a table for display. The method may be used to display tables on a small footprint device, such as a smart cellular phone, a personal data assistant, a handheld computer, etc. Small footprint devices typically have smaller displays than other computing systems such as desktop computers. The method described herein may perform certain optimizations for small footprint devices. For example, when calculating cell widths, a preferred width specified by the table author may be ignored, and a smaller width for the table may be used in order to conserve display space. In one embodiment the method may be employed to lay out HTML tables or tables described by other markup languages, such as XML-derived markup languages, in a web browser running on a small footprint device. A containment framework supporting applications and services running on a small footprint device is described herein.

Some types of tables, such as HTML tables, may be nested; i.e., table cells may comprise other tables. Many prior art table layout methods scaled exponentially with increasing table nesting complexity. The method described herein is optimized to speed up the layout of nested tables. This increase in efficiency is particularly important for small footprint devices which may have little processing power.

BRIEF DESCRIPTION OF THE DRAWINGS

Other objects and advantages of the invention will become apparent upon reading the following detailed description and upon reference to the accompanying drawings in which:

FIG. 9 is an example of a nested HTML table;

Figure 1:
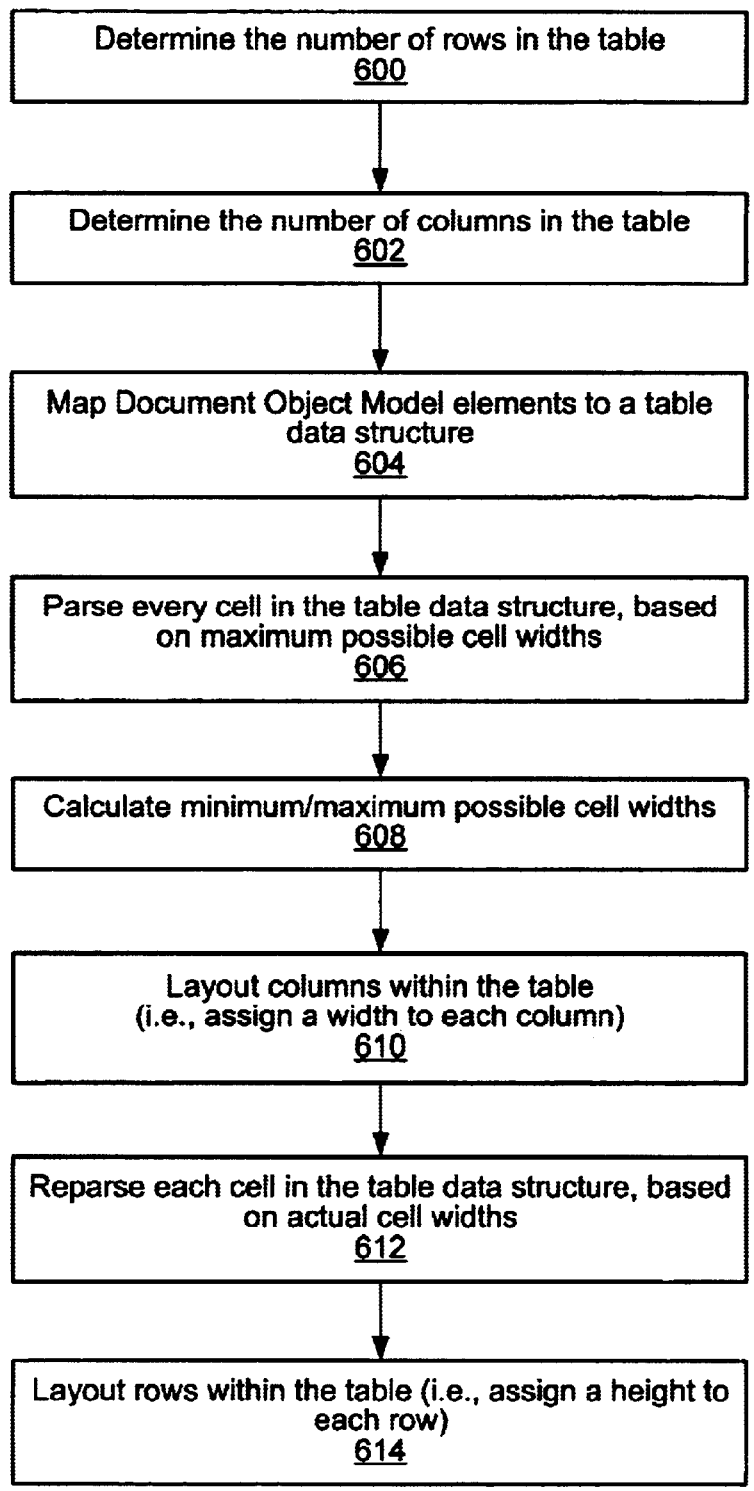
FIG. 1 is a flowchart diagram illustrating one embodiment of the table layout method.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1—Table Layout Flowchart Diagram

FIG. 1 is a flowchart diagram illustrating one embodiment of the table layout method. As discussed above, the method may be applied by a web browser to lay out an HTML table or a table described by another markup language, such as an XML-derived markup language. The steps of the flowchart of FIG. 1 illustrate such a use of the table layout method. However, the flowchart of FIG. 1 is exemplary; the table layout method may also be applied to other types of tables, such as tables described by other mark-up languages, e.g. mark-up languages defined using XML, tables embedded in a word processor document, etc.

It is assumed that the table has been parsed from some form such as a binary format or text code/tags which represent a table into objects or data structures which represent the table. The table layout method accesses these objects or data structures to lay out the table and prepare it for display (i.e. determine the exact width and heights of the columns, rows, and individual cells, and determine how content is layed out within each cell). In this HTML example, it is assumed that the HTML table code has been parsed into objects or data structures which represent the table. For example, a web browser which utilizes the Document Object Model (DOM) may parse the HTML table tags into objects which are logically related to each other as in a tree. The method illustrated in FIG. 1 may then be applied to the Document Model Objects to layout the table and prepare it for display.

As discussed in more detail below, laying out a table involves calculating the minimum and maximum possible widths for each cell and each column, and then coordinating these possible width values with the necessary or desired width for the overall table in order to assign an actual width value to each column. Once the width values are known, the row and cell heights may be calculated accordingly.

Tables and table cells may include various attributes which affect how they can or should be layed out. For example, HTML table tags may have a WIDTH attribute which specifies the width in pixels that the table should occupy on the device display. Individual column or cell tags may also have absolute or relative WIDTH attributes. As another example, HTML table cells may include COLSPAN or ROWSPAN attributes which specify the number of table columns or rows, respectively, which the cell spans.

Attributes such as these affect table layout in various ways. For example, if a cell spans multiple columns and contains content which cannot be highly compressed horizontally (e.g., if the cell holds another table), then the cell may affect the minimum possible widths of each of the columns it spans. Cases such as these make it difficult to design a table layout method that operates both correctly and efficiently. In such cases, information about the entire table or an entire region of the table must be known before specific width or height values may be determined. It is particularly important to efficiently handle cases such as these when laying out tables for a small footprint device which may have very low processing power. The method of the present invention is operable to account for such cases while still minimizing the required processing time.

In step 600 the number of rows in the table is determined. In step 602 the number of columns in the table is determined. For example if the table has been parsed into a list or tree of objects, according to the Document Object Model, then the method may traverse the list or tree to count the number of rows and columns in the table. In another embodiment, the number of table rows and columns may have been recorded as the tree was parsed, making steps 600 and 602 unnecessary.

In step 604 the objects or data structures representing the table is mapped to a table data structure suitable for efficient use by the table layout method. For example, the Document Object Model elements may be mapped to a two-dimensional array of HTMLTableCell objects using the number of rows and columns determined in steps 600 and 602 as the array dimensions. In another embodiment, the mapping of step 604 may be unnecessary if the objects or data structures representing the table already make it possible to efficiently traverse the table elements, quickly access individual cells, etc.

In step 606 each cell of the table data structure is parsed to lay out the contents within the cell. Laying out cell content comprises storing and/or modifying information in the table data structure or elsewhere which indicates how the content should be displayed within the cell. This information may be used when the table is displayed. Step 606 is the first of two times that each cell will be parsed. (As discussed below for step 612, the second parse is optimized to avoid unnecessary duplication of processing.)

Each cell of the table may comprise another table; i.e., tables may be nested. When a cell comprising a nested table is parsed, the steps illustrated in FIG. 1 are carried out for the nested table, just as for the top-level table. The layout method may (but does not necessarily) utilize recursion to process nested tables. Nested tables are discussed below in detail.

Parsing a cell comprises laying out the cell contents according to a particular cell width. Each time that a cell is parsed, a width parameter specifying the cell width is given to the parsing method. The height of a cell follows from how the cell content is layed out within the cell. For example, if a cell contains text, and the cell width passed to the parsing method is large enough to accommodate all of the text on a single line, then the cell height may be the height in pixels required to display a single line of text. However, if the parsing method must wrap the text to a second line in order fit the text content into the given cell width, then the cell height may be the height required to display two lines of text.

For the first parse in step 606, the value of the width parameter passed to the parsing method is the maximum possible width that each cell could be. For example, this maximum width may be equal to maxWidthOfTable—numberOfColumns *2*padding (where padding is a pixel value required as a spacer between columns). The parsing method lays out the contents of the cell to fit within this maximum possible value. The resulting cell width may be less than this maximum possible value. For example, if the maximum possible width of the table is very large, and a cell contains only a single text character, then the cell width required may be much less than the maximum possible width for a cell.

The maximum cell width parameter value is used in step 606 in order to determine the maximum width that each cell can span once the content is layed out within the cell. Step 608 uses this information to calculate the maximum possible width for each column in the table. Step 608 also calculates the minimum possible width for each column. As discussed above, cells that span multiple columns may affect the widths of the spanned columns. Step 608 involves processing each cell of each column and tracking the minimum/maximum cell widths and also tracking which multiple-column-spanning cell of a column (if there are any) has the largest maximum width. Step 608 is illustrated in more detail in FIGS. 2–4.

In step 610, the minimum/maximum possible column widths are considered along with the available space for the table in order to lay out the columns within the table (i.e., set actual values for the column widths). Step 610 is illustrated in more detail in FIG. 6.

In step 612, each cell in the table data structure is parsed for the second time. In this second parsing step, the width parameter passed to the parsing method is the actual width of the column that the cell belongs to, which was determined in step 610. Thus, step 612 lays out the cell content according to the actual width of the cell as it will appear when the table is displayed. Optimizations made in step 612 are discussed in more detail below.

As discussed above, the height of a cell depends on the width of the cell. Once the cell content of each cell is layed out according to the final width of the cell in step 612, the height of each cell is known. Thus, the height of each row in the table may be calculated after step 612 is performed. In step 614 the rows are layed out within the table (i.e., each row height is set).

As used herein, terms implying a sequential order of method steps refer to a logical relationship between the steps and do not necessarily imply an order in which the steps must be executed in an actual embodiment of the method. For example, steps 612 and 614 may actually execute concurrently. Cells of the table may be parsed by row in step 612, and step 614 may set a row's height as the final heights of the cells involved in the determination of the row's height become known.

However, just as cells may span multiple columns, they may also span multiple rows. Thus, other cells besides only the cells belonging to a particular row may affect the row's height. Step 614 operates in an efficient manner to handle this case. Step 614 is illustrated in more detail in FIGS. 7 and 8.

Once the row heights have been set in step 614, the table is prepared for display. The dimensions of rows and columns have been set, and the content within each cell has been properly layed out for these dimensions. As discussed in more detail below, certain aspects of the present method help to minimize the display space required for a table. These aspects of the method, in combination with its inherent efficiency, make the method especially well-suited to be used to display tables in resource-constrained small footprint devices. However, the method is not limited to use in small footprint devices.

Figure 2:
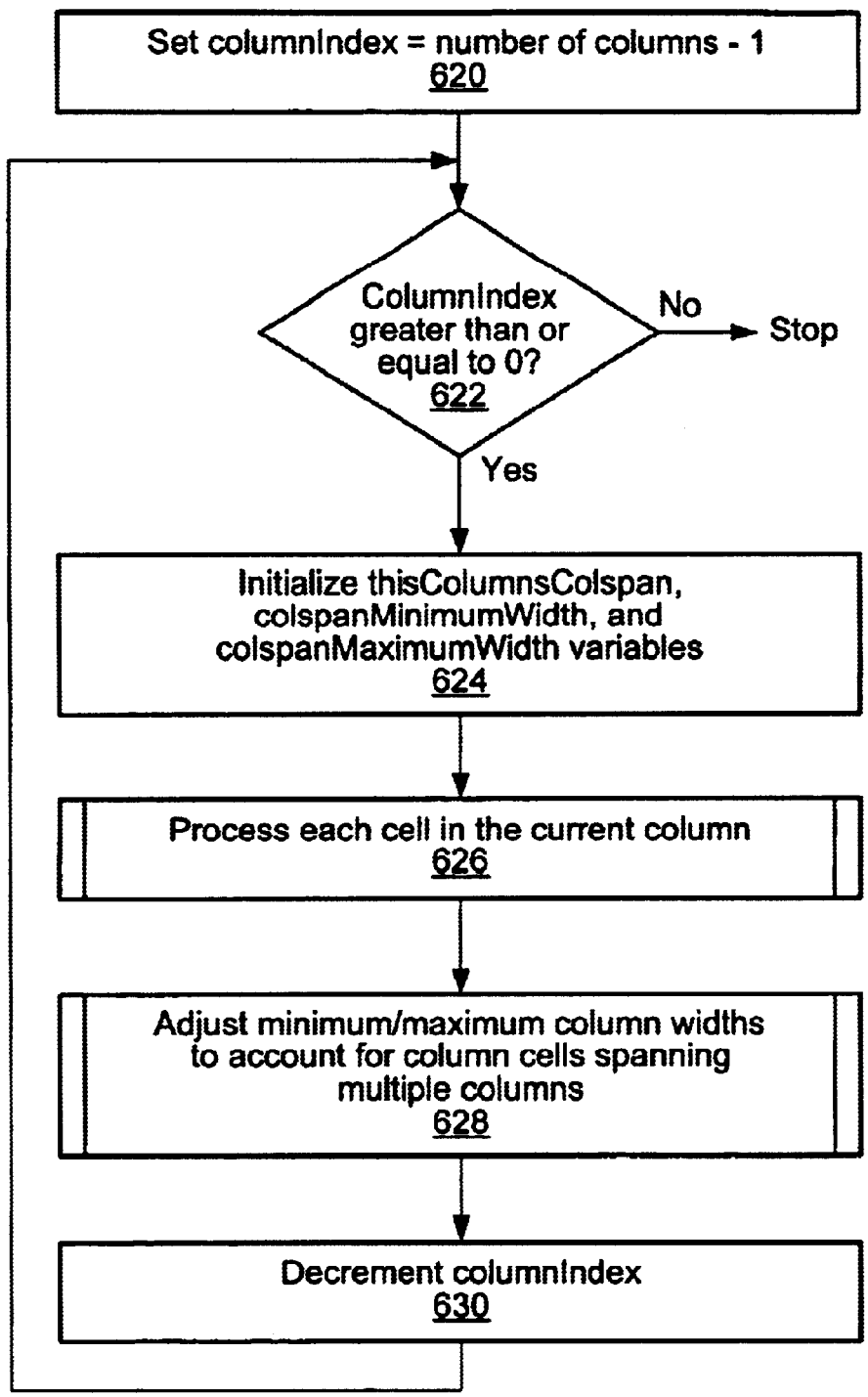
FIGS. 2–4 are flowchart diagrams illustrating the steps involved in calculating the minimum and maximum possible column widths for a table.
Figure 3:
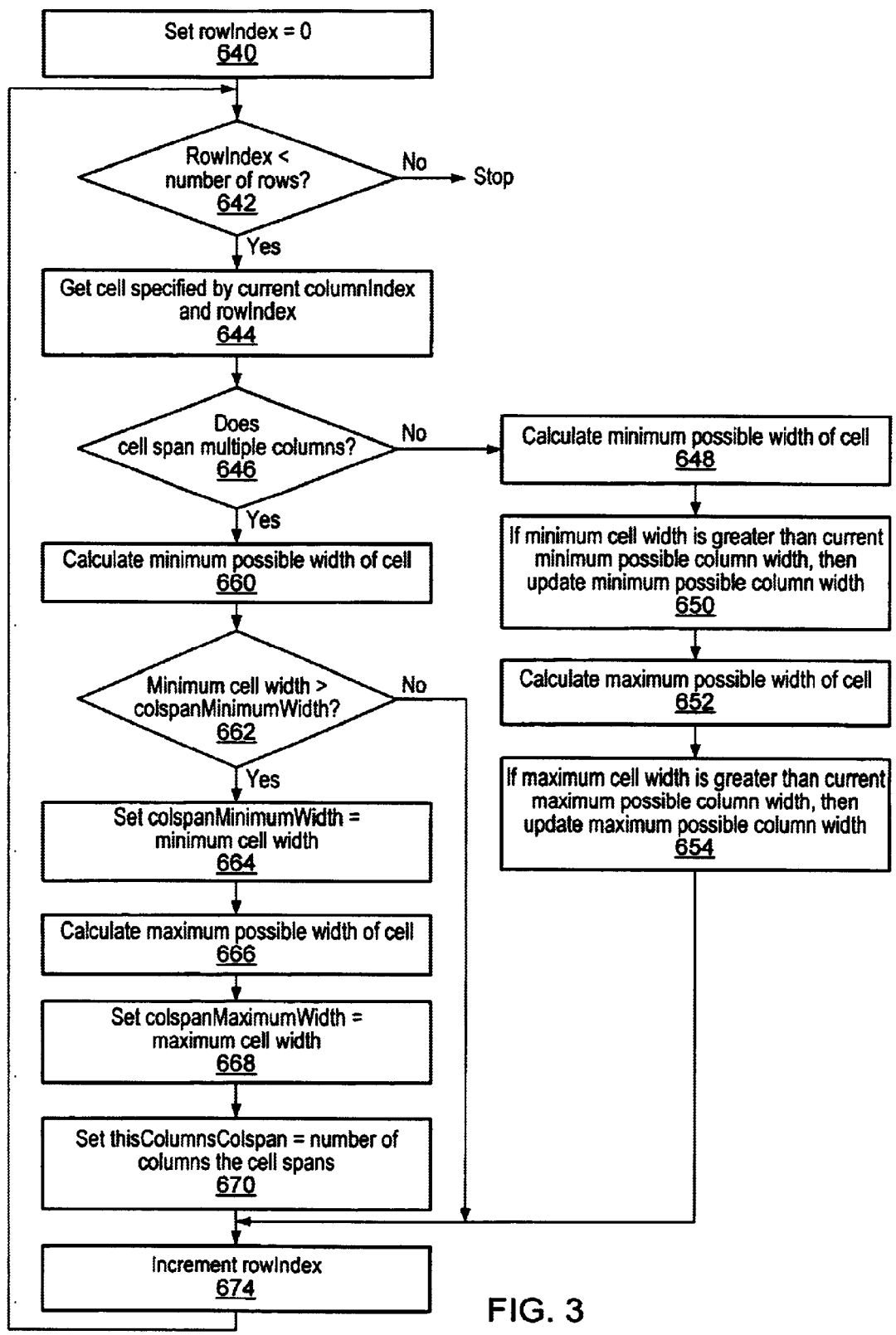
Figure 4:
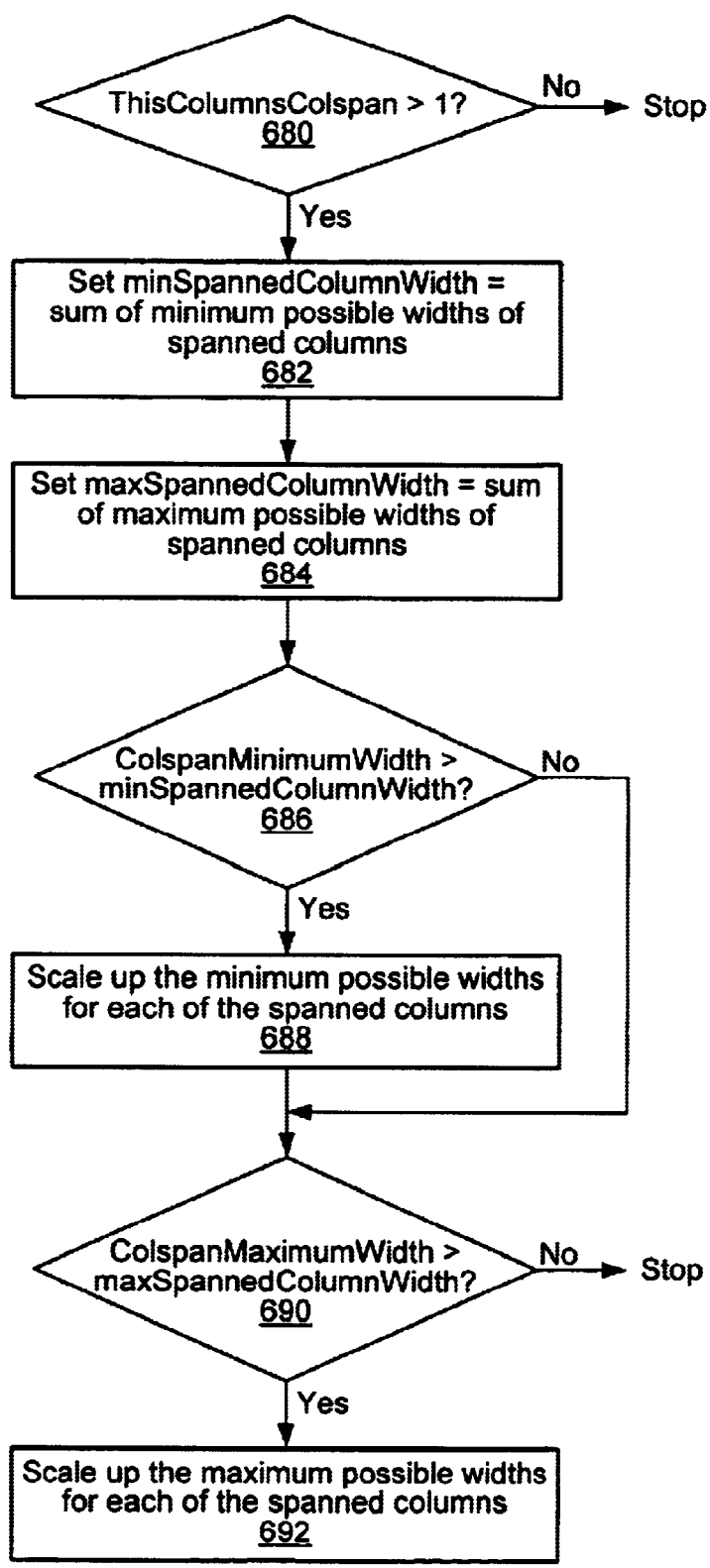

FIGS. 2–4: Determining Minimum/Maximum Possible Column Widths

In step 608 of FIG. 1, the minimum and maximum possible widths for each column are determined. FIGS. 2–4 are flowchart diagrams illustrating step 608 in more detail.

As discussed above, some table cells may span multiple columns. The following HTML code gives an example of an HTML table comprising a column-spanning cell:

```
<TABLE BORDER="1">
<TR><TD>Row 0, Column 0 <TD>Row 0, Column 1 <TD>Row 0, Column 2
<TR><TD>Row 1, Column 0 <TD COLSPAN="2">Row 1, Column 1
<TR><TD>Row 2, Column 0 <TD>Row 2, Column 1 <TD>Row 2, Column 2
</TABLE>
```

Figure 5:
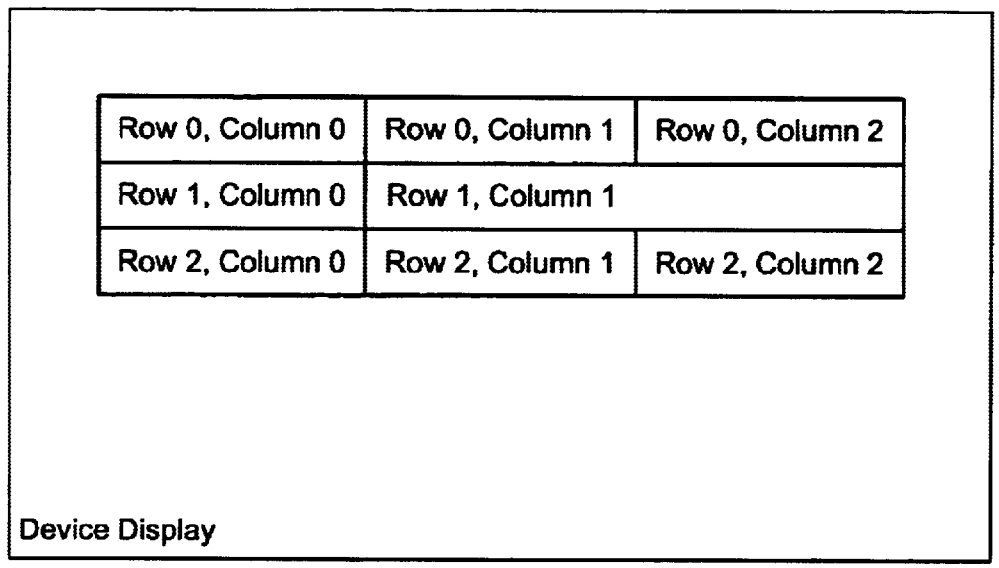
FIG. 5 is an example of an HTML table comprising a column-spanning cell.

FIG. 5 illustrates how this table may look when displayed. The cells of the table are labeled with their corresponding row and column numbers. The second cell of the middle row (row 1) of the table has a "COLSPAN" attribute which specifies that the cell spans two columns. Although this cell spans two columns, it is represented as a single entry in the table data structure created in step 604 of FIG. 1. In that table data structure, the cell is a member of the middle column, column 1, and there is no row 1 cell for the right-most column, column 2. Thus, a cell which spans multiple columns may be said to be a member of the left-most column which it spans.

In the steps illustrated in FIG. 2, each column of the table is traversed. For each column, all the cells of the column are processed in order to find the minimum/maximum possible cell widths. The column cell with the largest minimum possible width determines the minimum possible width for the column, and the column cell with the largest maximum possible width determines the maximum possible width for the column. Since any cells in the table which span multiple columns are members of the left-most column which they span, the columns are traversed in a right-to-left order. This allows the calculation of the minimum/maximum possible column widths to take place in a single pass through the table columns. If the columns were traversed in a left-to-right order then the minimum/maximum width values could not be determined for columns having a column-spanning cell on the first pass through, since the factors determining the width of the column-spanning cell would not yet be known.

To set up the right-to-left column traversal, the column index is set to the index of the right-most column in step 620 of FIG. 2. In step 622 the column index loop control variable is tested to make it is within range. If all the columns have been processed then the execution illustrated in FIG. 2 completes. Otherwise, in step 624 certain variables are initialized in preparation for an iteration through the column-processing loop. The use of these variables is described below. It is noted that the use of variables such as these represents one embodiment of the table layout method, and other embodiments are possible. For example, information may be recorded in the table data structure itself instead of in variables.

In step 626 each cell of the column specified by the column index is processed. Step 626 is illustrated in more detail in the flowchart diagram of FIG. 3. In step 640 of FIG. 3, the row index is set to 0. In step 642 the row index loop control variable is tested to make it is within range. If the index is out of range, then all the cells of the current column have been processed, and the execution illustrated in FIG. 3 completes. Otherwise, in step 644 the cell referenced by the current column index and row index is obtained. Although step 644 is shown as a separate step for the sake of clarity, it may not be necessary in some embodiments. For example, if the table data structure is implemented as a two-dimensional array, the cell may be accessed by simply referencing the array element specified by the column and row indices.

In step 646, the cell obtained in step 644 is checked to see whether it spans multiple columns. (This information may be recorded when the table data structure is created, or it may be deduced from the table data structure.) If the cell does not span multiple columns, then execution proceeds to step 648. In step 648, the minimum possible width for the cell is calculated. If this width is greater than the current minimum possible width recorded for the column, then the minimum possible column width is set to the minimum possible width for the cell. (The minimum possible width for each column is initialized to zero.) Steps 652 and 654 are similar to steps 648 and 650. The maximum possible width for the cell is calculated in step 652. The current maximum possible width for the column is updated to this value in step 654 if necessary. Execution proceeds from step 654 to step 674.

Steps 648 and 652 may calculate the minimum and maximum possible cell widths, respectively, in various ways. These calculations may depend on cell content. For example, a cell may contain content such as another table, which affects these width values. The calculations may utilize information obtained when the cell was parsed in step 606 of FIG. 1. The calculations may also use information comprised in the table itself. For example, an author of a table contained in a word processor document may set a table attribute which specifies the type of wrapping to apply to a cell. As another example, an HTML author may request that a cell be set to a certain width by using a WIDTH attribute.

However, in some embodiments, such information may be ignored when calculating the minimum cell widths. For example, HTML tables are typically designed with a desktop computer display screen in mind. However, these tables often do not display well on a small footprint device with a small display screen. When the present method is applied to render tables for a small footprint device, information such as WIDTH attributes may be ignored, and the minimum cell width may instead be based on cell content, which minimizes the display space consumed by a table.

If it is determined in step 646 that the cell does span multiple columns, then execution proceeds to step 660. In step 660, the minimum possible width for the cell is calculated. This step is identical to step 648. In step 662, the minimum cell width is compared to the colspanMinimumWidth variable. A column may have more than one cell which spans multiple columns. The colspanMinimumWidth variable tracks the largest minimum width value of all these cells. If the minimum width value for the current cell is not greater than the colspanMinimumWidth value already recorded, then the current cell is ignored, and execution proceeds to step 674. As described below, the colspanMinimumWidth variable is used to adjust the minimum widths of the columns spanned by the cell, if necessary. For this adjustment, it is only necessary to track the largest minimum possible cell width of all the spanning cells.

If the minimum width value for the current cell is greater than the colspanMinimumWidth value already recorded, then the colspanMinimumWidth variable is updated in step 664. In step 666 the maximum possible width for the cell is calculated. In step 668 the colspanMaximumWidth variable is set to this maximum possible cell width. In step 670, the thisColumnsColspan variable is set to the number of columns spanned by the cell. The use of the colspanMinimumWidth, colspanMaximumWidth, and thisColumnsColspan variables is discussed below for FIG. 4.

As described above, step 674 is reached either from step 654 or step 670. At this point, the cell referenced by the current column and row indices has been processed, and the next cell in the current column will be processed. Thus, the rowIndex variable is incremented, and execution loops back to step 642. From step 642, another loop iteration through steps 644–674 occurs, or the loop ends, as appropriate. Once the loop of FIG. 3 ends, step 626 of FIG. 2 is complete, and execution proceeds to step 628 of FIG. 2. At this point, the cells of the current column have been processed to determine the minimum/maximum possible widths for the column. As described previously, the colspanMinimumWidth and colspanMaximumWidth variables may be set in step 626. In step 628, these values are used to adjust the minimum and maximum possible column widths of columns spanned by a cell in the current column, if necessary. Step 628 is described in more detail below with reference to FIG. 4. Once step 628 is complete, the current column has been processed. The columnIndex loop control variable is decremented in step 630 so that it references the next column to the left in the table. From step 630 execution proceeds to step 622, where the loop ends if the column index is out of range, or another loop iteration is performed, as appropriate.

FIG. 4 is a flowchart diagram illustrating step 628 of FIG. 2 in more detail. The steps of FIG. 4 utilize the variables colspanMinimumWidth, colspanMaximumWidth, and thisColumnsColspan which were set while processing the current column in the steps of FIG. 3. As described above, information for only one of a column's multiple column-spanning cells is tracked (the one with the largest minimum possible width). This cell is referred to below as the "largest spanning cell".

The thisColumnsColspan variable indicates the number of columns spanned by the largest spanning cell. In step 680 the thisColumnsColspan variable is checked to see whether it is greater than 1. This variable is initialized to 1 in step 624 at the beginning of each iteration through the column-processing loop. If thisColumnsColspan is not greater than 1, then no cells spanning multiple columns were found in step 626, and execution returns to step 630 of FIG. 2. Otherwise, execution proceeds to step 682 of FIG. 4.

In step 682 the minSpannedColumnWidth variable is calculated by summing up the minimum possible width values recorded for each of the columns spanned by the largest spanning cell. Since the table columns are traversed in a right-to-left order, each of these values is already known. In step 684 the maxSpannedColumnWidth variable is calculated by summing up the maximum possible width values recorded for each of the columns spanned by the largest spanning cell.

In step 686 the colspanMinimumWidth variable is compared to the minSpannedColumnWidth variable. If colspanMinimumWidth is less than or equal to minSpannedColumnWidth, then the minimum possible widths of the spanned columns are already sufficiently large to hold the minimum possible width of the largest spanning cell. In this case, execution proceeds to step 690. However, if colspanMinimumWidth is greater than minSpannedColumnWidth, then one or more of the minimum possible width values of the spanned columns must be adjusted in order to hold the largest spanning cell. As shown in step 688, in one embodiment, a factor based on colspanMinimumWidth−minSpannedColumnWidth may be calculated, and the minimum possible width value for each of the spanned columns may be scaled upward. Other adjustment methods may be used in other embodiments.

Steps 690 and 692 are similar to steps 686 and 688. If colspanMaximumWidth is greater than maxSpannedColumnWidth, then one or more of the maximum possible width values of the spanned columns are increased in step 692 so that the maximum possible column widths are large enough to hold the maximum possible width of the largest spanning cell.

Figure 6:
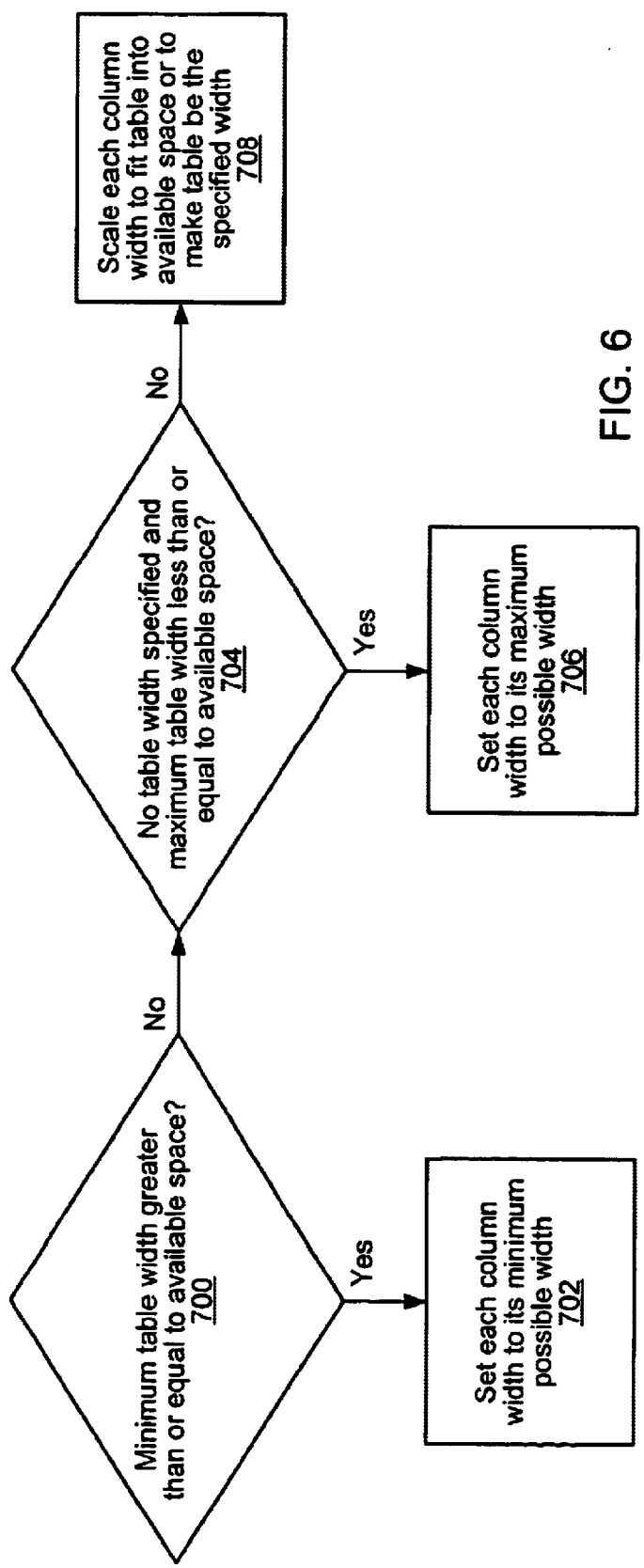
FIG. 6 is a flowchart diagram illustrating the steps involved in assigning a width to each column.

FIG. 6—Laying Out Table Columns

In step 610 of FIG. 1, the columns are layed out within the table; i.e., the minimum/maximum possible column values are considered along with the available width for the table in order to assign an actual width to each column. FIG. 6 is a flowchart diagram illustrating step 610 in more detail. The present method allows the author of a table to specify a width for the table. The column width values are set to achieve this overall table width when possible.

As shown in FIG. 6, there are three basic cases. In step 700 the minimum table width is calculated and compared to the available display space for the table. The minimum table width may be calculated by summing the minimum possible column widths for each column in the table. The available display space may be determined in various ways. For example, the available space value may be passed as a parameter to the table layout method. If the minimum table width is too large to fit into the available display space, then the minimum table width is used, and in step 702 the final column width for each column is set to its minimum value.

If the minimum table width is small enough to fit into the available space, then execution proceeds to step 704. If no preferred width for the table was specified, then the maximum table width is calculated. Otherwise, execution proceeds to step 708. The maximum table width may be calculated by summing the maximum possible column widths for each column in the table. If the maximum table value is small enough to fit into the available space, then the maximum table width is used, and in step 706 the final column width for each column is set to its maximum value.

If neither of the conditions in step 700 or 704 are met, then the table columns are scaled to make the table width be a particular value. If a preferred width for the table is specified, then the columns are scaled to match this preferred table width value. If no preferred table width is specified and the maximum table width is too large for the available space, then the columns are scaled to match the available space value. Any of various heuristics or algorithms may be applied for the scaling. For example, each column may be scaled with an equation such as:

$$\text{colWidth} = \text{minColWidth} + ((\text{maxColWidth} - \text{minColWidth}) * (\text{availableSpace} - \text{minTableWidth}) / (\text{maxTableWidth} - \text{minTableWidth}))$$

Other scaling methods may be applied in other embodiments. For example, individual scaling factors may be applied to different columns, depending on each column's content.

Figure 7:
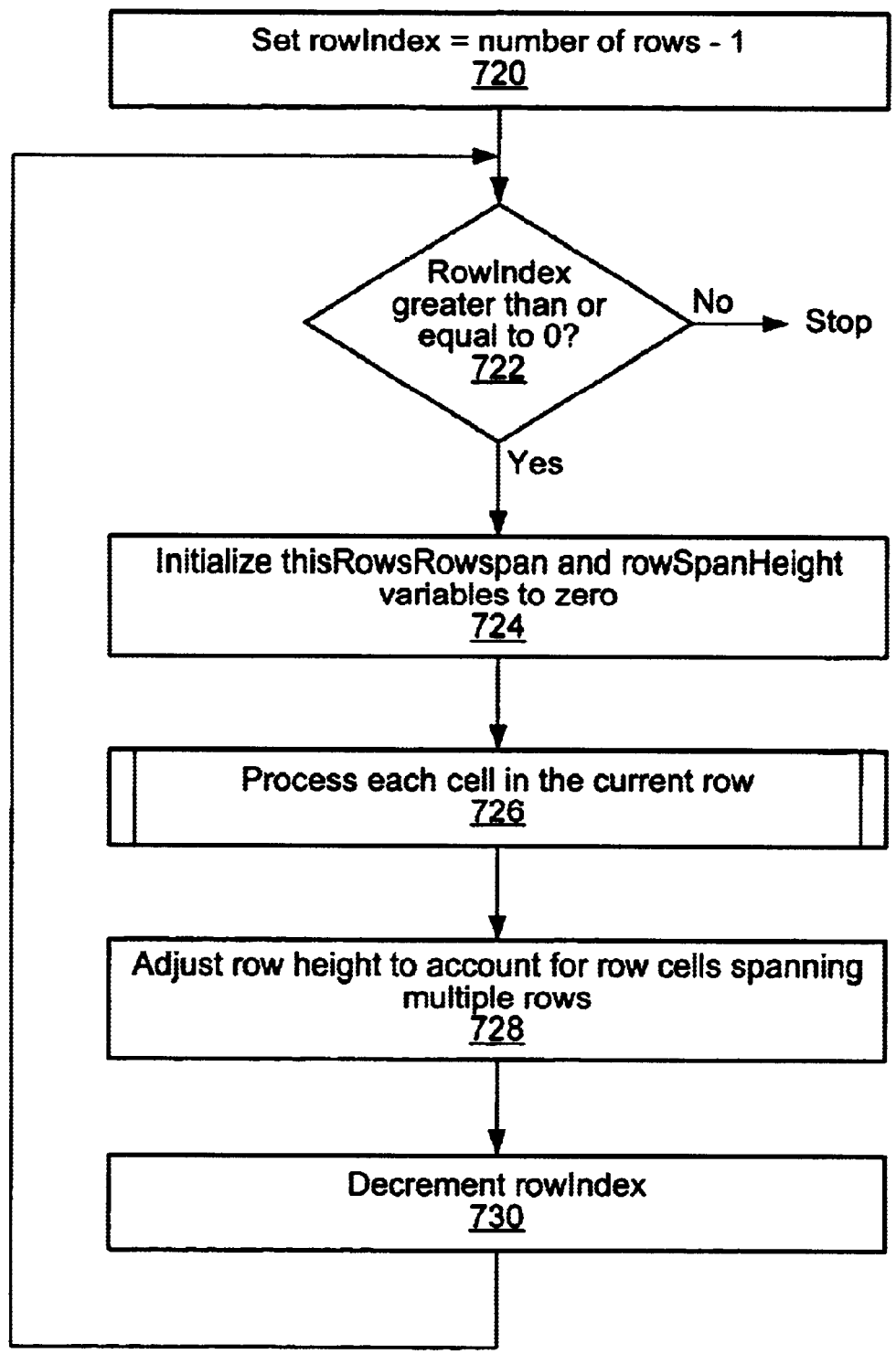
FIGS. 7 and 8 are flowchart diagrams illustrating the steps involved in assigning a height to each row.
Figure 8:
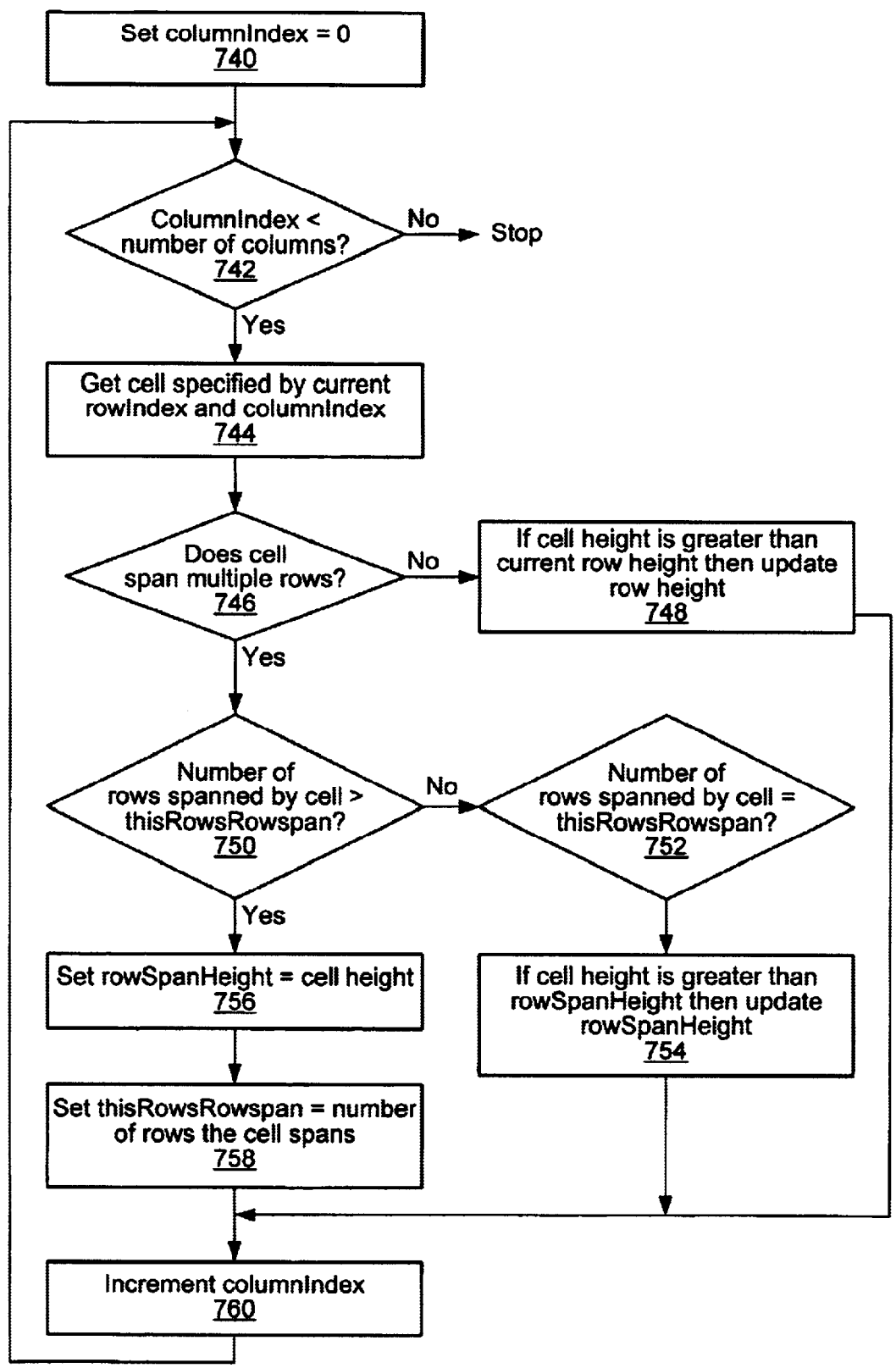

FIGS. 7 and 8—Laying Out Table Columns

In step 614 of FIG. 1, the rows are layed out within the table; i.e., the height of each row is set. FIGS. 7 and 8 are flowchart diagrams illustrating step 614 in detail.

In step 610 of FIG. 1, the actual column widths for the table are set. In step 612, the table cells are processed to lay out the cell content using these actual column widths. The height of each individual cell is determined by how the content is layed out within the cell. In step 614, the individual cell heights are considered for each row to determine the height for the entire row. Just as table cells may span multiple columns, they may also span multiple rows. Step 614 accounts for cells that span multiple rows by processing rows in a bottom-to-top order, for reasons similar to the right-to-left column processing order described above.

To set up the bottom-to-top row traversal, the row index is set to the index of the bottom-most column in step 720 of FIG. 7. In step 722 the row index loop control variable is tested to make it is within range. If all the rows have been processed then the execution illustrated in FIG. 7 completes. Otherwise, in step 724 certain variables are initialized in preparation for an iteration through the row-processing loop. The use of these variables is described below. It is noted that the use of variables such as these represents one embodiment of the table layout method, and other embodiments are possible. For example, information may be recorded in the table data structure itself instead of in variables.

In step 726 each cell of the row specified by the row index is processed. Step 726 is illustrated in more detail in the flowchart diagram of FIG. 8. In step 740 of FIG. 8, the column index is set to 0. In step 742 the column index loop control variable is tested to make it is within range. If the index is out of range, then all the cells of the current row have been processed, and the execution illustrated in FIG. 8 completes. Otherwise, in step 744 the cell referenced by the current row index and column index is obtained. Although step 744 is shown as a separate step for the sake of clarity, it may not be necessary in some embodiments. For example, if the table data structure is implemented as a two-dimensional array, the cell may be accessed by simply referencing the array element specified by the row and column indices.

In step 746, the cell obtained in step 744 is checked to see whether it spans multiple rows. If the cell does not span multiple rows, then execution proceeds to step 748. In step 748, the cell height is compared to the current height recorded for the row. (The height for each row is initialized to zero.) If the cell height is greater than the row height, then the height of the current row is set to the cell height. Execution proceeds from step 748 to step 760.

If the current cell (i.e., the cell obtained in step 744) does span multiple rows then execution proceeds from step 746 to step 750. In step 750 the number of rows spanned by the current cell is compared to the thisRowsRowspan variable value. If the current cell spans more rows than the value of thisRowsRowspan, then execution proceeds to step 756, where the value of the rowSpanHeight variable is set to the height of the current cell. The rowSpanHeight variable indicates the maximum height spanned a row-spanning cell of the current row. Execution proceeds from step 756 to step 758, where the thisRowsRowspan value is updated to the number of rows spanned by the current cell. Execution proceeds from step 758 to step 760.

In step 750, if the current cell does not span more rows than the value of thisRowsRowspan, then execution proceeds to step 752. In step 752, the number of rows spanned by the current cell is again compared to the thisRowsRowspan variable value. If the two values are equal, then in step 754 the current cell height is checked to see if it is greater than the current value of rowSpanHeight. If so, then rowSpanHeight is updated to the height of the current cell, and execution proceeds to step 760. If the number of rows spanned by the current cell is not equal to thisRowsRowspan in the comparison of step 752, then execution proceeds to step 760.

Once step 760 is reached from step 748, 752, or 754, the current cell has been processed to determine how its height or other characteristics, such as the number of rows it spans, affect the calculation of the height of the current row. In step 760, the column index is incremented to reference the next column in the row, and execution loops back to step 742. From step 742, another loop iteration may be performed, or if all of the row's cells have been processed, then the row processing illustrated in FIG. 8 for step 726 of FIG. 7 may end.

Once the cells of the current row have been processed in step 726, execution proceeds to step 728 of FIG. 7. In step 728, the heights of the rows spanned by the largest spanning cell of the current row may be adjusted, if necessary. The row heights of these rows may be summed. If this sum is less than the height of the largest spanning cell (indicated by the rowSpanHeight variable), then the row heights may be adjusted. As discussed above for column width adjustment, the row height adjustment may be performed using any of various methods.

Once any necessary row height adjustments are made in step 728, the row index is decremented in step 730 to refer to the next highest row in the table, and execution loops back to step 722. From step 722, another loop iteration may be performed, or the execution illustrated in the flowchart diagram of FIG. 7 may end if all the table rows have already been processed.

FIG. 9—Improved Performance for Nested Tables

As noted previously, some types of tables allow table nesting. For example, HTML tables may be nested. The following HTML code shows an example of a nested HTML table:

FIG. 9 illustrates what this table may look like when displayed.

In web pages, nested HTML tables are fairly common, since HTML authors often use tables for formatting web pages. Thus, it is desirable for a table layout method to efficiently handle nested tables. However, the time required for many prior art table layout methods to process nested tables increases exponentially as table complexity increases. The present method improves layout performance for nested tables by scaling linearly in time as table nesting increases, instead of scaling exponentially. This performance improvement is especially important in laying out tables for small footprint devices, since these devices may have very little processing power. Also, the situations and environments in which these devices are used may make it especially important to layout tables quickly. For example, a cellular phone user may need to quickly view a web page containing nested tables to obtain an important phone number needed for an immediate situation, whereas a desktop user may typically browse the web in a more leisurely manner.

As shown in FIG. 1, the present table layout method comprises two steps in which each cell of the table is parsed, steps 606 and 612. During these parsing steps, if a cell includes a nested table, then the steps of the table layout method are applied to the nested table. The present method achieves linear scaling by optimizing the second parsing step. Information from the first parsing step is stored so that many of the layout method steps may reuse this information in the second parsing step, instead of recomputing it. In this way, many of the most processing-intensive steps are eliminated.

FIG. 1 may be summarized as follows:
Count the rows and columns in the table (steps 600 and 602)
Map objects to a table data structure (step 604)
Parse table cells, based on maximum possible cell widths (step 606)
Calculate minimum/maximum possible column widths (step 608)
Layout columns (step 610)
Reparse table cells, based on actual cell widths (step 612)
Layout rows (step 614)
Information obtained in steps 600–608 may be recorded the first time that a table is parsed so that only steps 610–614 must be performed the second time the table is parsed. Thus, an execution trace may appear as follows for a table (Table 1) with a single cell, where the single cell contains a nested table (Table 2).
PARSE Table 1:
Count the rows and columns in Table 1
Map Table 1 objects to a table data structure

```
<TABLE BORDER="1">
<TR><TD>Row 0, Column 0 <TD>Row 0, Column 1 <TD>  Row 0, Column 2
<TR><TD>Row 1, Column 0 <TD>Row 1, Column 1 <TD>  Row 1, Column 2
                                                  <BR>Nested table:
                                                  <TABLE BORDER="1">
                                                  <TR><TD>Row 0, Column 0
                                                    <TD>Row 0, Column 1
                                                  <TR><TD>Row 1, Column 0
                                                    <TD>Row 1, Column 1
                                                  </TABLE>
<TR><TD>Row 2, Column 0 <TD>Row 2, Column 1 <TD>  Row 2, Column 2
</TABLE>
```

Parse Table 1 cells, based on maximum possible cell widths
PARSE Table 2
  Count the rows and columns in Table 2
  Map Table 2 objects to a table data structure
  Parse Table 2 cells, based on maximum possible cell widths
  Calculate minimum/maximum possible column widths for Table 2
  Layout Table 2 columns
  Reparse Table 2 cells, based on actual cell widths
  Layout Table 2 rows
Calculate minimum/maximum possible column widths for Table 1
Layout Table 1 columns
Reparse Table 1 cells, based on actual cell widths
  PARSE Table 2
  Layout Table 2 columns
  Reparse Table 2 cells, based on actual cell widths
  Layout Table 2 rows
Layout Table 1 rows The second Table 2 parse is performed in order to set the width of Table 2 to the width of the Table 1 cell which contains it. The three steps shown for the second Table 2 parse still need to use information obtained in steps 600–608. For example, the "Layout Table 2 columns" step needs to use the minimum and maximum possible column widths. However, this information may be reused from steps 600–608 of the first Table 2 parse.

The elimination of steps 600–608 may be accomplished in various ways. In one embodiment, nested tables may be processed using a recursive algorithm. Flags may be set and information may be stored the first time the table layout method is performed for a table. These flags may be checked, and the stored information may be reused for the second table parse. In one recursive embodiment of the optimized table layout method for HTML tables, a significant speed improvement was noted when loading a complex web page containing a highly nested table. This web page took nine seconds to render and display when the optimization was not performed, versus three seconds when the optimizations were performed. Since the display of the page is the same for either case, the speed improvement was attributed to the optimizations described above.

Small Footprint Device Application/Service Containment Framework

In one embodiment the table layout method described herein is employed in a web browser application running on a small footprint device. A web browser is a program enabling users to view web pages. A modular application/service framework may be necessary or desirable to implement this type of web browser. The containment framework described below allows for applications/services running on a small footprint device to be built from various modules. For example, this containment framework may allow a service which lays out a web page to be implemented in a separate service module.

Figure 10:
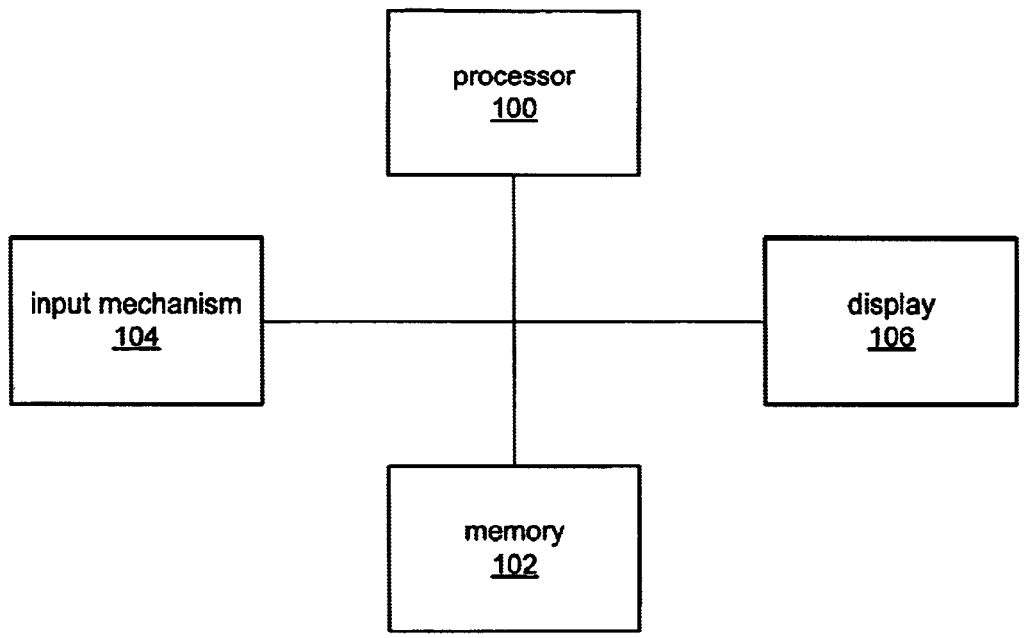
FIG. 10 is a block diagram illustrating the hardware architecture of a typical small footprint device.

FIG. 10—Hardware Architecture Block Diagram

FIG. 10 is a block diagram illustrating the hardware architecture of a typical small footprint device. As used herein, a small footprint device is a hardware device comprising computing resources such as a processor and a system memory, but having significantly greater constraints on one or more of these resources than a typical desktop computer has. For example, a small footprint device may have two megabytes of memory or less, whereas a typical desktop system may have 64 megabytes or more. Also a typical small footprint device may have significantly less processing power than a typical desktop computing system, either in terms of processor type, or processor speed, or both. For example, a personal data assistant device may have a 16 MHz processor, whereas a typical desktop system may have a processor speed of 100 MHz or higher. Also, a typical small footprint device may have a display size significantly smaller than the display screen of a desktop computing system. For example, the display screen of a handheld computer is typically small compared to the display screen of a desktop monitor.

It is noted that the specific numbers given are exemplary only and are used for comparison purposes. For example, a personal data assistant having eight megabytes of memory or more may still be a small footprint device, although the device has more memory than the typical figure of two megabytes given above.

Small footprint devices may also have constraints on other resource types compared to typical desktop computing systems, besides the memory, processor, and display size resources described above. For example, a typical small footprint device may not have a hard disk, may not have a network connection, or may have an intermittent network connection, or may have a wireless network connection, etc.

Many small footprint devices are portable and/or are small compared to desktop computers, but are not necessarily so. Also, many small footprint devices are primarily or exclusively battery-operated. Also, small footprint devices may typically have a more limited or narrow range of usage possibilities than a typical desktop computing system. Small footprint devices include, but are not limited to, the following examples: handheld computers, wearable devices (e.g., wristwatch computers), personal data assistants (PDAs), "smart" cellular telephones, set-top boxes, game consoles, global positioning system (GPS) units, electronic textbook devices, etc. Since new classes of consumer devices are rapidly emerging, it is not possible to provide an exhaustive list of small footprint devices. However, the term "small footprint device" is intended to include such devices as may reasonably be included within the spirit and scope of the term as described above.

FIG. 10 illustrates a block diagram of a typical small footprint device. It is noted that the small footprint device may have various different architectures, as desired. The hardware elements not necessary to understand the operation of the present invention have been omitted for simplicity.

As shown in FIG. 10, the small footprint device contains a processor 100. The processor 100 may be any of various types, including an x86 processor, e.g., a Pentium class, a PowerPC processor, as well as other less powerful processors or processors developed specifically for small footprint devices. The processor 100 may have various clock speeds, including clock speeds similar to those found in desktop computer-class processors, as well as lower speeds such as 16 MHz.

Also shown in FIG. 10 the device includes a system memory 102. The system memory 102 may comprise memory of various types including RAM or ROM. A typical small footprint device may have a very small memory storage capacity compared to a typical desktop computer system.

A small footprint device may also comprise one or more input mechanisms. An input mechanism 104 is illustrated in FIG. 10. The input mechanism 104 may be any of various types, as appropriate to a particular device. For example, the input mechanism may be a keypad, mouse, trackball, touch pen, microphone, etc.

A small footprint device may also comprise one or more display mechanisms. A display 106 is illustrated in FIG. 10. However, a small footprint device may not comprise a display, or may comprise another type of output mechanism, such as an audio speaker. The display mechanism 106 may be any of various types, as appropriate to a particular device. The display mechanism for a typical small footprint device, such as a smart cellular phone, may be small compared to the display of a desktop computer system.

Figure 11:
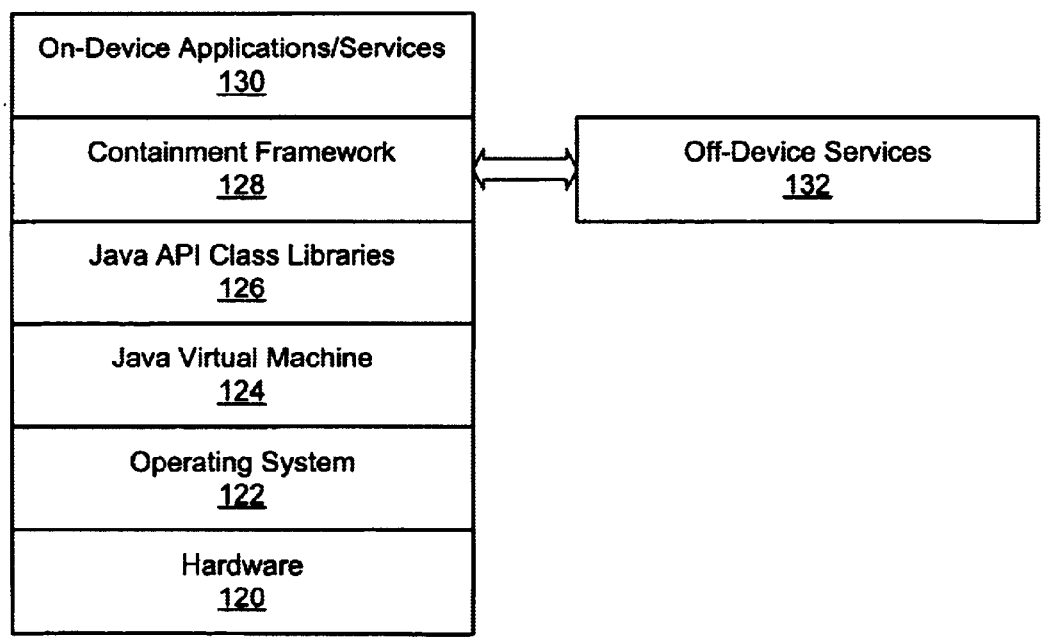
FIG. 11 illustrates a typical hierarchy of hardware/software layers involved in a system running applications and services within the containment framework.

FIG. 11—Hardware/Software Hierarchy Diagram

FIG. 11 illustrates a typical hierarchy of hardware/software layers involved in a system running applications and services within the containment framework. The drawing is exemplary, and various layers may be added, combined, or omitted as appropriate for a particular device or implementation.

The base layer shown in FIG. 11 is the device hardware layer 120, which comprises the hardware resources necessary to support a software system, such as a processor and system memory. In one embodiment, the hardware of a small footprint device, such as the small footprint device hardware example illustrated in FIG. 10, implements the hardware layer 120 illustrated in FIG. 11. However, in other embodiments, the hardware layer 120 may be implemented in other types of devices, such a device with even greater resource constraints than a typical small footprint device, such as a smart card.

As shown in FIG. 11, the next layer up from the hardware layer is the operating system layer 122. As is well known in the art, the operating system functions as an interface layer between the device hardware and software running on the device and serves as a manager for low-level tasks such as input/output, memory management, etc. The operating system 122 illustrated in FIG. 11 may be any particular operating system which supports the higher layers shown in FIG. 11. The operating system 122 may be a small and efficient one that is suitable for or written particularly for use in a small footprint device. For example, the operating system 122 may be the Java™ operating system available from Sun Microsystems, Inc.

In one embodiment, the containment framework is implemented in a Java™ application environment as one or more Java™ classes. As shown in FIG. 11, the Java™ virtual machine layer 124 and Java™ application programming interface (API) class libraries layer 126 are the next layers up from the operating system. These two layers together make up the Java™ application environment, or Java™ platform. Classes implementing the containment framework may be built using the Java™ libraries 126 and compiled into bytecodes. The bytecodes are instructions which execute on the Java™ virtual machine 124, which interacts with the operating system 122 and/or the device hardware 120.

In one embodiment, the containment framework is implemented in the PersonalJava™ Java™ application environment, which is a Java™ platform designed to be highly scalable, modular, and configurable, while requiring minimal system resources. PersonalJava™ comprises the Java™ virtual machine and a subset of the Java™ API, including core and optional APIs and class libraries. In addition, the PersonalJava™ API includes specific features required by consumer applications in resource-limited environments, such as a specialized version of the Java™ abstract window toolkit (AWT). The PersonalJava™ AWT library is targeted and tuned for consumer product look and feel, providing graphics and windowing features while supporting low-resolution displays and alternate input devices (via an extended event model for mouse- and keyboard-less devices).

Referring again to FIG. 11, the containment framework 128 is shown as the next layer up from the Java™ platform layer. As noted above, the containment framework 128 may also be based on other platforms. As described in detail below, the containment framework 128 manages program modules, e.g. by enabling module registration, lookup, instance tracking, etc. Modules may provide various services. The containment framework 128 enables modules to request other modules, in order to use their services. Applications may be implemented as modules that utilize the services of other modules. The containment framework 128 thus provides a lightweight, extendable service and application framework, enabling applications to coexist and share a modular code base.

This type of extendable architecture enabling multiple program modules to cooperate is an important development for small footprint devices. Small footprint devices have historically been limited to relatively narrow uses. For example, cellular phones were typically used for telephony and little else. However, as various technologies are developed allowing small footprint devices to become "smarter", having general-purpose processors, larger display screens, etc., it has become desirable to expand the scope of applications used in small footprint devices.

The present containment framework may enable the types of applications and services generally associated with desktop computing environments to work together in a small footprint device, in a manner that desktop computer users are familiar with. As illustrated in FIG. 11 and described above, services and applications 130 running on a small footprint device may be implemented as modules built on the containment framework layer 128. For example, the Personal Applications suite available from Sun Microsystems, Inc. is built using one embodiment of the containment framework 128. The Personal Applications Suite comprises an integrated set of applications such as a browser, an email client, and a personal organizer.

FIG. 11 also illustrates the ability of some embodiments of the containment framework 128 to integrate off-device services 132 with on-device applications/services 130. For example, the containment framework 128 may provide an interface between a small footprint device and a network such as a Jini™ network. A small footprint device system may register its services for use by other devices or clients in a network. The containment framework may also enable services and applications within the small footrpint device to look up and use services provided by other network devices. The integration of services of the small footprint device with network services is discussed in more detail below for FIG. 12.

FIGS. 12–16: Exemplary Network Device and Service Federation

Figure 12:
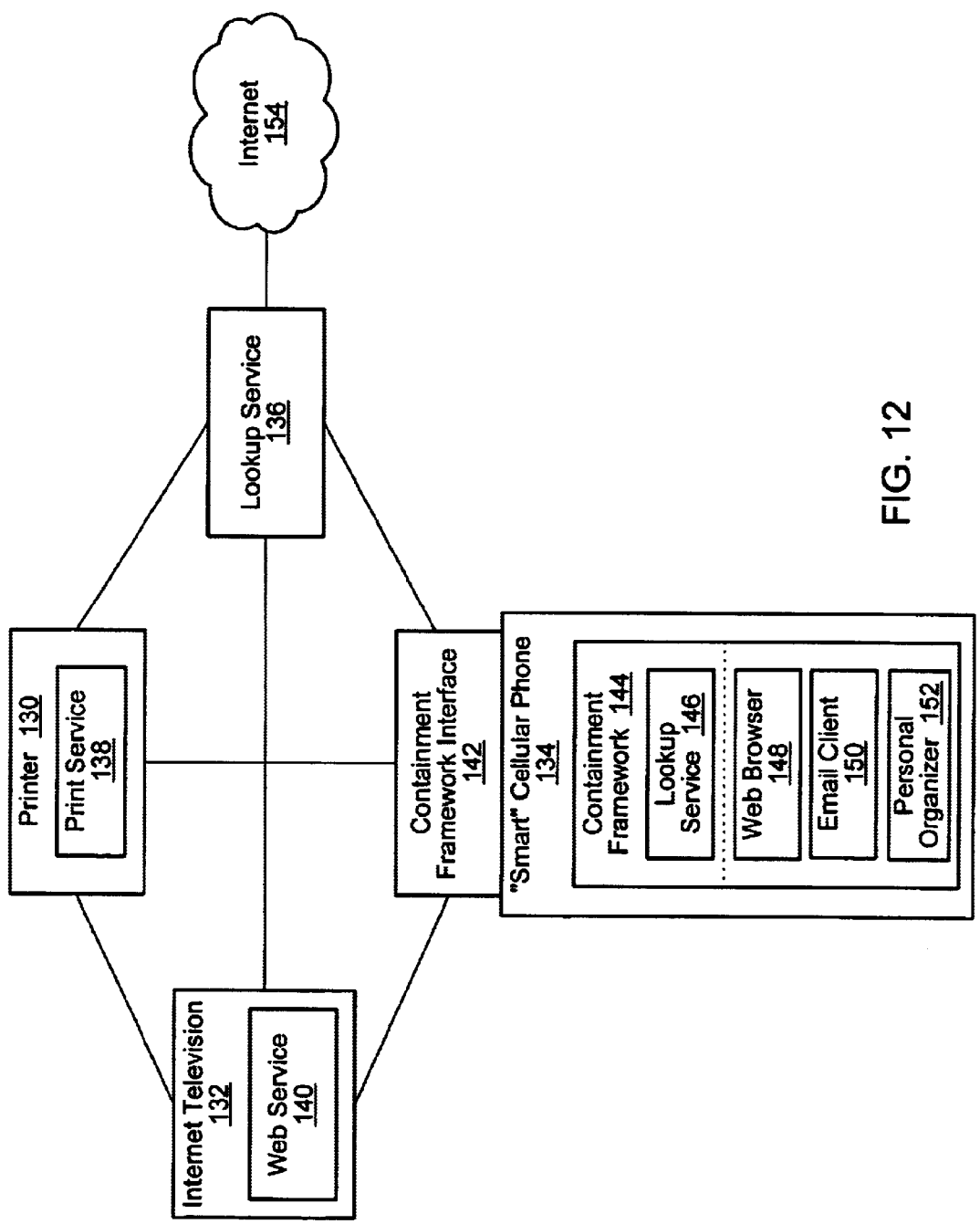
FIG. 12 illustrates an exemplary network in which a small footprint device running applications/services in the containment framework is connected to a local vice-based network.

FIG. 12 illustrates an exemplary network in which a small footprint device running applications/services in the containment framework is connected to a local service-based network. In the example shown, a smart cellular phone 134 utilizing the containment framework 144 is connected to the network. Also shown attached to the network are a printer 130 and an internet-enabled television 132. In this example, it is assumed that the printer 130 and television 132 devices are operable to export services to a network and possibly use the services of other devices on the network. For example, the printer may export its print service 138, and the internet television may look up the print service and use it to print a web page. To facilitate the federation of devices and services in this manner, a lookup service 136 is located on the network. The lookup service 136 may reside on a separate device such as a network server.

The federation of devices and services may be implemented in various ways. For example, Jini™ technology, available from Sun Microsystems, Inc., comprises components and a programming model which enables the type of distributed system illustrated in FIG. 12. In one embodiment, the local network shown in FIG. 12 may be a Jini™ network, and the printer 130 and internet television 132 may be Jini™ -enabled devices. Each device is operable to find the Jini™ network lookup service and register the services it offers with the lookup service. The lookup service maps interfaces indicating the functionality provided by a service to sets of objects that implement the service.

Figure 13:
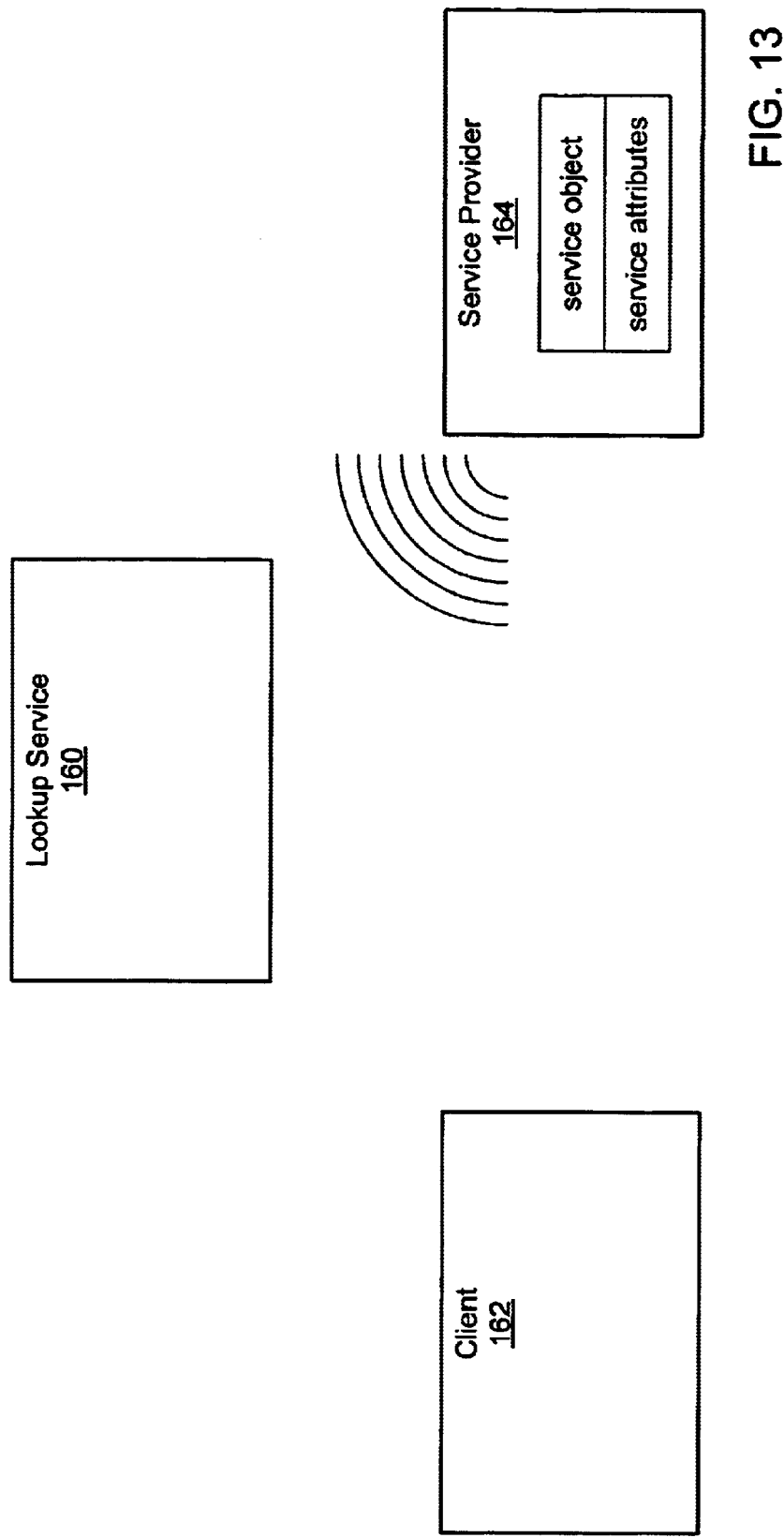
FIG. 13 illustrates the discovery process, in which a service provider finds a lookup service.

To add its services to a service federation, a device or other service provider may first locate an appropriate lookup service by using a "discovery" protocol. FIG. 13 illustrates the discovery process. As shown, the service provider 164, e.g. the printer 130 shown in FIG. 12, may broadcast a request on the local network for any lookup services to identify themselves.

Figure 14:
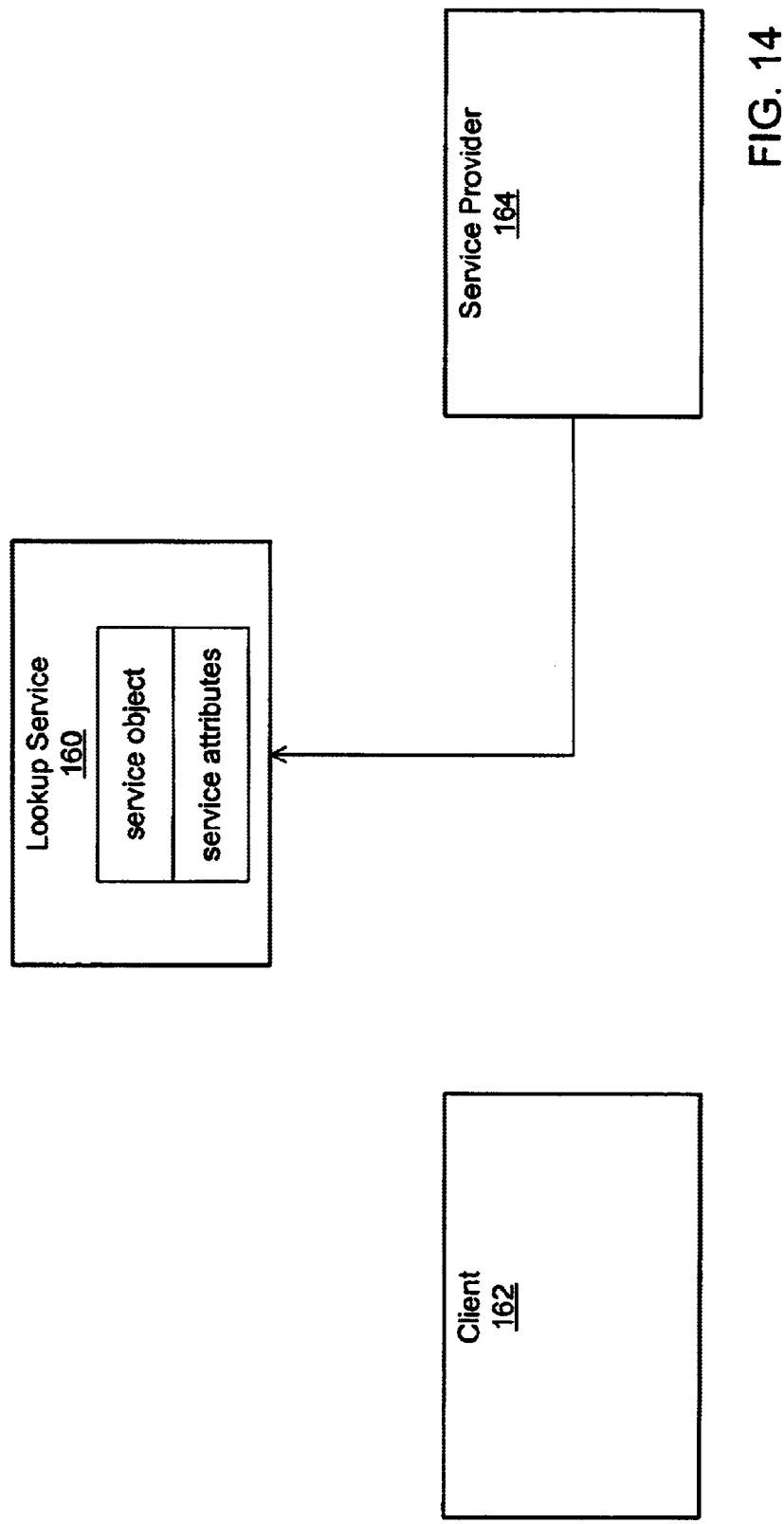
FIG. 14 illustrates the join process, in which a service provider registers its service with a lookup service.

Once the service provider 164 has located the lookup service 160, the service provider 164 may register its service with the lookup service 160 by using a "join" protocol. FIG. 14 illustrates the join process. The service provider 164 may create a service object which clients can use to invoke the service. As illustrated in FIG. 14, the service object for the provided services may then be loaded into the lookup service 160, along with service attributes or descriptors containing information about the types or names of services provided. For example, in a Jini™ network, the printer 130 shown in FIG. 12 may create a service object which comprises a Java™ programming interface for the print service 138. The printer 130 may then call a "register" method of the lookup service 136, passing this service object, along with attributes which specify that the service 138 being registered is a print service, the printing resolution, the possible paper sizes, etc.

Figure 15:
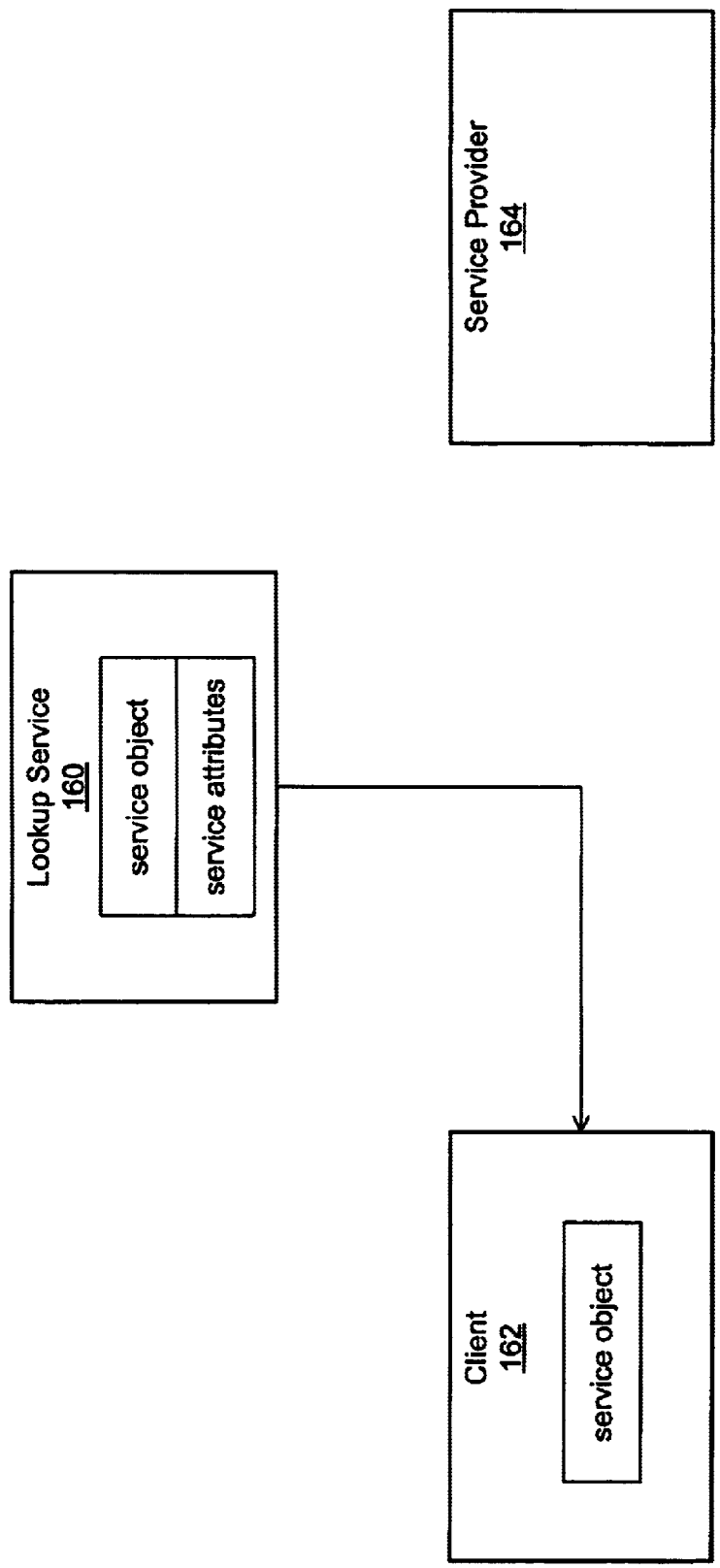
FIG. 15 illustrates the lookup process, in which a client requests a service from a lookup service.

Once the service provider 164 has joined its services with the lookup service 160, other network clients may request and use the services. The process of requesting a service, called lookup, is illustrated in FIG. 15. After discovering the lookup service, a client 162 may request a service from the lookup service 160 using a description of the requested service. The lookup service 160 attempts to match the description given by the requestor to the services that have joined the lookup service. The lookup service 160 may use the service attributes sent by the service provider 164 during the join process to perform this matching. If a match is found, the lookup service 160 provides the appropriate service object to the client 162. For example, a Java™ interface for the requested service may be provided to the client 162.

Figure 16:
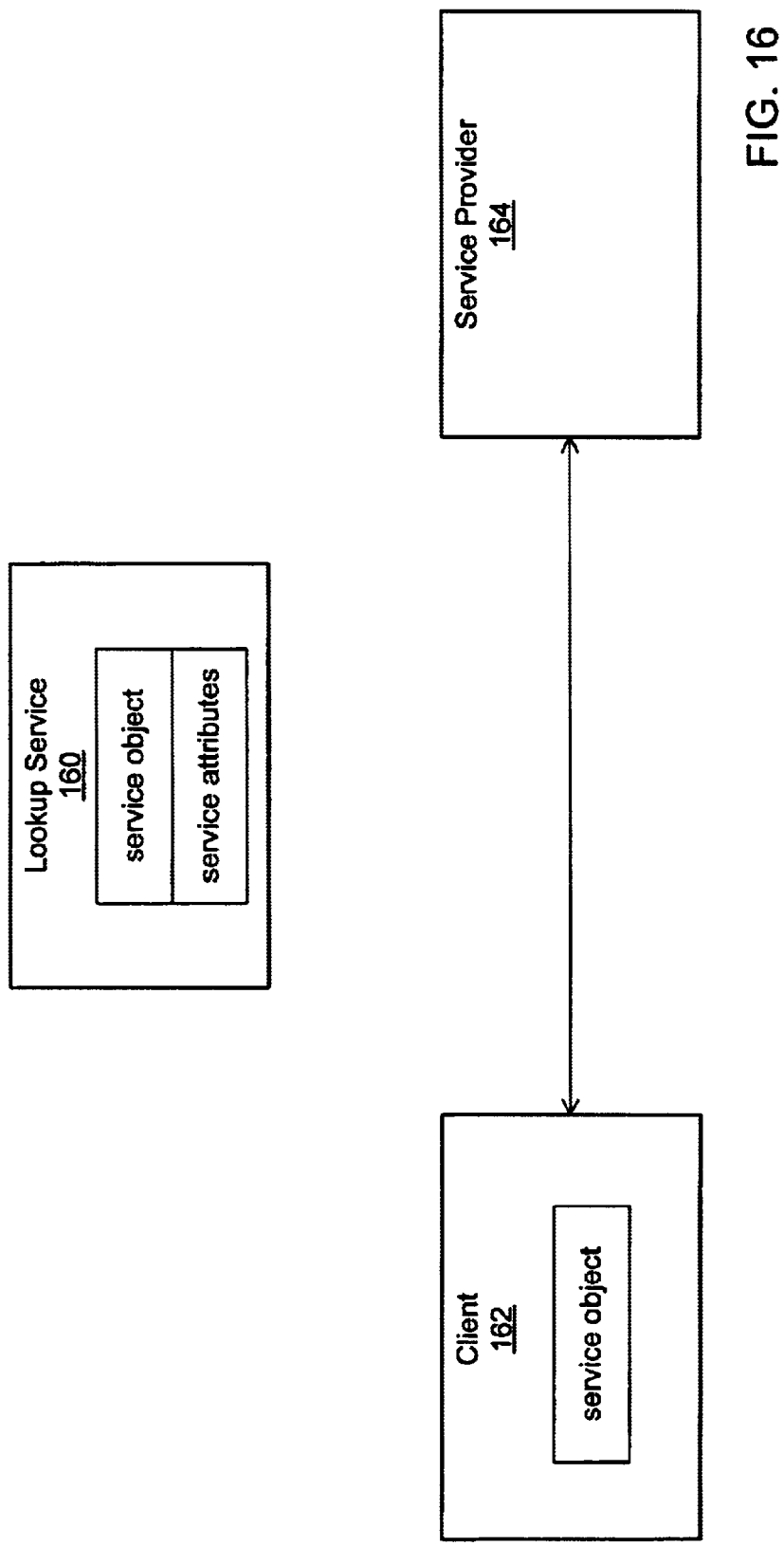
FIG. 16 illustrates the service invocation process, in which a client invokes a service using a service object received from a lookup service.

Once a client 162 has received a service object from the lookup service, the client may invoke the service. FIG. 16 illustrates the process of service invocation. When a service is invoked, the client 162 and the service provider 164 may communicate directly with each other. Any of various interaction protocols may be used for this communication. For example, the protocol used may be Java™ Remote Method Invocation (RMI), CORBA, DCOM, etc. The service object that a client receives from the lookup service may call back to code located at the service provider, e.g. by calling an RMI method, or it may execute locally to provide the requested service, or it may use a combination of these approaches.

As shown in FIG. 12, the lookup service 136 for a local network may also act as a gateway to an outside network such as the Internet 154. The service-based distributed computing model may thus be extended to include clients and services located outside the local network. For example, the technology being developed for the Open Service Gateway Initiative (OSGI) may be leveraged to implement this type of distributed computing system.

This type of service sharing between and across different networks and the Internet may enable new types of applications to be developed. For example, merchants may use Internet services to record data about specific consumers, and advertising service providers may use this data to push context-specific ads onto consumer devices, depending on which local network the device is connected to, etc. For example, a customer may enter a shopping mall and connect a personal data assistant (PDA) into a local network for the shopping mall, via a wireless connection. An Internet-based consumer data service may be joined with the lookup service for the shopping mall network and may provide information about the specific consumer who has just plugged into the mall network. Services running in the shopping mall network may then use this data together with other factors such as the customer's current location within the mall, the time of day, etc., in order to generate personalized ads and push them onto the customer's PDA.

Many other examples of services based on the network of FIG. 12 are possible. For example: network-enabled consumer devices within a home may utilize a service provided by a power company, via the Internet, which manages power consumption within the home; security service providers may monitor a home or specific devices via network services and may notify the owner immediately when property is broken into; health service providers may remotely monitor a patient's state by communicating with medical instruments; etc.

In the examples listed above, an assumption is made that devices are able to transparently connect to a network, integrate network services with device-resident services, and export device-resident services for use by network clients. The containment framework described herein may provide the necessary interface to integrate services and applications of small footprint devices such as personal data assistants, handheld computers, smart cellular phones, etc. with a network service federation.

As shown in FIG. 12 and described in more detail below, the containment framework 144 has its own type of lookup service 146. The lookup service 146 within the containment framework 144 may operate similarly to the local network lookup service described above, utilizing discovery, join, lookup, and service invocation processes. For example, the personal organizer application 152 may utilize various services such as a calendar service, a contact list service, a bookmark service, etc. (not shown). The personal organizer application 152 may obtain a reference for communicating with these services via the containment framework lookup service 146.

The containment framework 144 may integrate its own lookup service 146 with an off-device lookup service such as the local network lookup service 136 shown in FIG. 12. In this way, off-device services such as the print service 138 and the web service 140 may become available to the applications/services 148, 150, and 152 of the containment framework, and vice versa. For example, the personal organizer application 152 may request a print service from the containment framework lookup service 146. The containment framework lookup service 146 may first search for an on-device print service. If one is not found, the containment framework lookup service 146 may then request a print service from the network lookup service 136. The service object for the print service 138 may then be returned to the personal organizer 152. An interface 142 between the on-device services/applications and the off-device services is illustrated in FIG. 12. Details follow on how the integration of on-device/off-device services may be implemented.

As noted above, clients of services may themselves be services to other clients. For example, the email client "application" 150 of the smart cellular phone shown in FIG. 12 may itself be a service to a client running in the containment framework 144 or to a network client. For example, in the case of malfunction, the printer 130 shown in FIG. 12 may request an email service so that it can send diagnostic information to a service technician. If the network lookup service 136 cannot find a network-based email service, it may request an email service from the smart cellular phone 134 via the interface 142. A service object for the email application/service 150 running in the containment framework 144 may be passed to the requesting printer client 130. In this example, the printer client 130 may communicate directly with the email application/service 150 to send an email containing diagnostic information to a printer service technician. The email application/service 150 may send the email immediately if it is able to find an email server service, or it may send the email later when such a service becomes available when the cellular phone user connects to a different network.

Although the above description references specific protocols and programming models, such as Jini™ technology, it is noted that these specific technologies are exemplary only. For example, the applications and services within the containment framework may be integrated with clients, services, devices, networks, etc. which employ any of various types of standards, protocols, and programming models, including, but not limited to: Jini™, CORBA, COM/DCOM, Bluetooth, CAL, CEBus, HAVi, Home API, HomePNA, HomePnP, HomeRF, VESA, etc.

Figure 17:
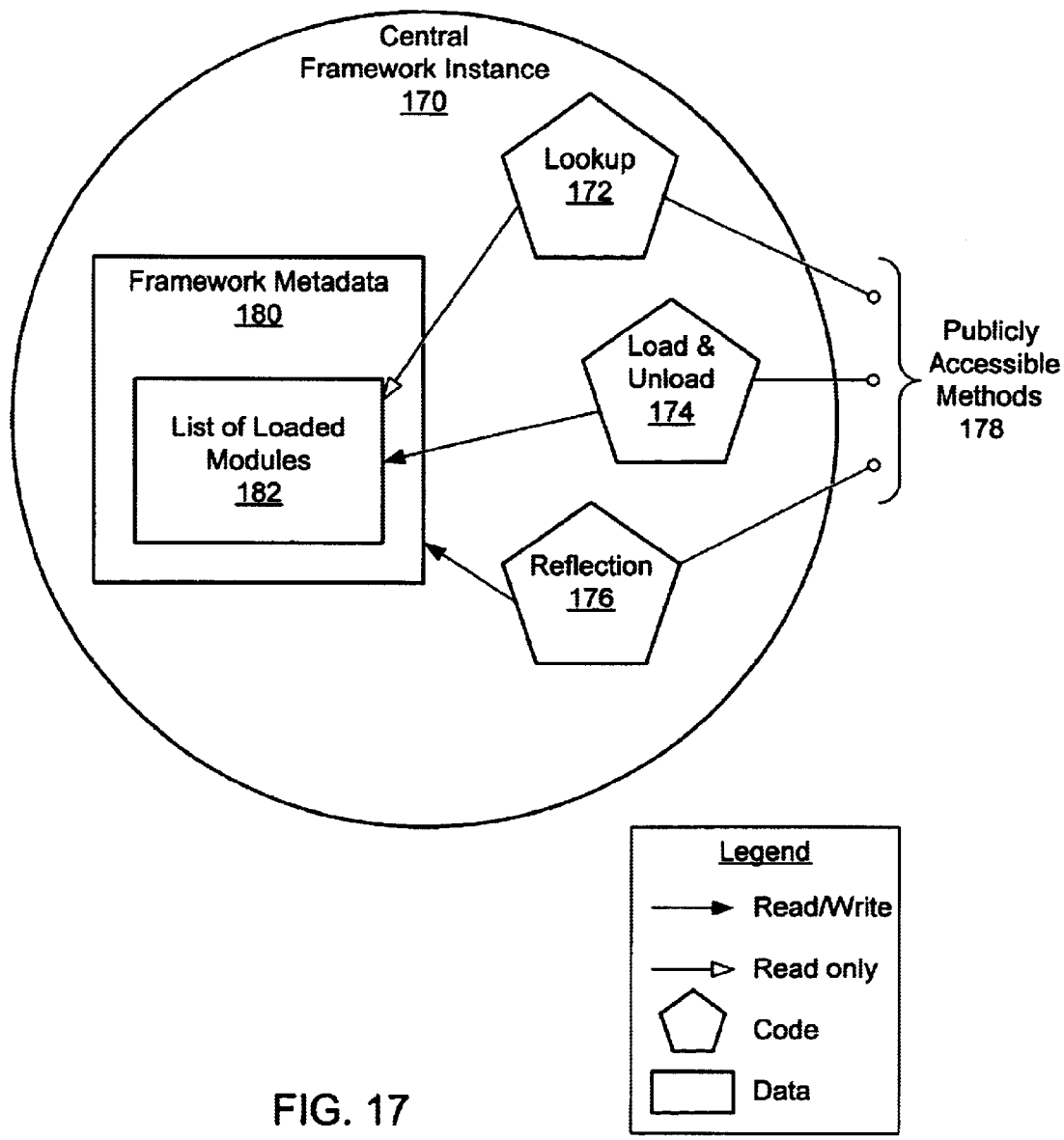
FIG. 17 is an abstract block diagram illustrating the basic architecture of the containment framework.

FIG. 17—Containment Framework Block Diagram

FIG. 17 is an abstract block diagram illustrating the basic architecture of the containment framework environment. As described above, the containment framework provides a containment system for applications and services. These applications and services are managed within the system as units called modules. The containment framework is lightweight; in one embodiment, modules may interact with a single framework manager object which performs all module management. This manager is referred to herein as the central framework instance. In one embodiment, the central framework instance may be implemented as an instance of a Java™ class. FIG. 17 illustrates the central framework instance 170 and the code and data it comprises/manages. It is noted that FIG. 17 illustrates one embodiment of the containment framework. Other embodiments may employ a different architecture and/or may be implemented in different programming languages or software environments. For example, the module management/containment performed by the central framework instance 170 illustrated in FIG. 17 may be performed by multiple objects or components in other embodiments.

As shown in FIG. 17, the central framework instance 170 comprises data 182 representing the modules currently loaded in the system. The containment framework architecture is non-hierarchical. Thus, the loaded modules may be represented as a flat list or array of modules. This non-hierarchical system helps to keep the core containment framework code and the modules running within the framework compact. Systems employing hierarchical components such as JavaBeans™ components may provide associated benefits, but the benefits come at the expense of a more complex management system requiring more system resources. However, the containment framework does provide a mechanism for the non-hierarchical modules to gain many of the benefits of a hierarchical containment system. This mechanism is described below for FIGS. 18 and 19.

As shown in FIG. 17, in one embodiment the central framework instance 170 comprises publicly accessible methods 178 which modules may call. These methods may be broken into abstract groups. For example, one group of methods 172 may comprise lookup methods. Lookup methods implement the lookup service functionality described above. Modules may pass a module descriptor to a lookup method of the central framework instance 170 to locate a particular service module. The containment framework lookup process is described below for FIG. 21. Another group of framework methods 174 may comprise methods for loading and unloading modules. After finding a service module, a client module may request the central framework instance 170 to load the service module and return a reference to the loaded module. The client module may then invoke the service. The client may call a framework method to release the service module when it is finished using it. Although described as distinct groups, the division of methods into lookup and load/unload groups may be only a conceptual division. For example, in one embodiment a lookup method may also load a module that it matches and return a reference to the matched module.

FIG. 17 also illustrates system data 180 referred to as framework metadata, which may comprise data 182 describing the list of loaded modules and other data describing the state of the system. Another abstract group of methods 176 of the central framework instance 170 may comprise reflection methods. Reflection methods are somewhat different than the other groups of methods since they provide direct access to the core metadata 180. A special class of modules called system modules may call reflection methods to gain access to the metadata 180. Regular modules may not access the metadata 180.

After receiving a reference to the core system data 180, a system module may use or modify the data in any way desirable. Thus, the containment framework is highly extendable. The central framework instance 170 may itself remain small, and system modules may be added to implement any functionality not already enabled by the central framework instance 170. For example, a system module may enable the integration described above for FIGS. 12–16 between applications/services running within the containment framework and services based in an external network.

In this example, such a system module may be written as a secondary lookup service that conforms to the protocols and programming model of the external network. For example, for a Jini™ network, a system module may be written which discovers the Jini™ network lookup service and joins the network lookup service, registering itself as a secondary lookup service. When a network client requests a service, the network lookup service may invoke the lookup service implemented by the system module. This system module may attempt to find a service module within the containment framework which matches the description of the requested service. If a match is found, then the system module may perform any necessary steps to export the service module to the network client, since the system module has full access to the system module list and metadata. For example, the system module may load and register the matched service module into the system and return an interface, such as a Java™ interface, to the newly loaded module to the requestor.

Figure 18:
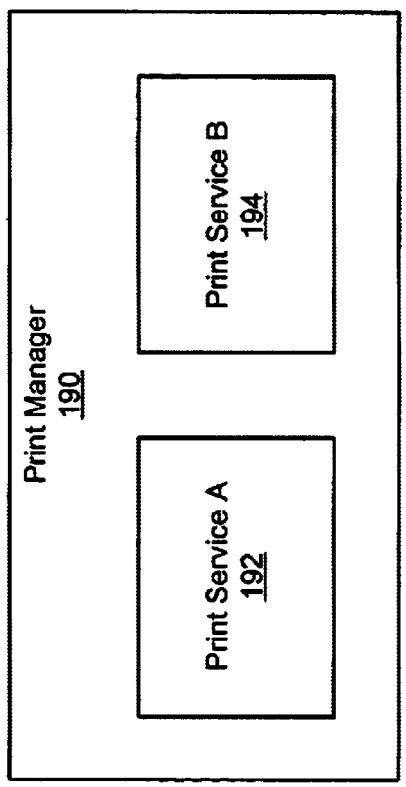
FIGS. 18 and 19 illustrate the use of module request listeners in the containment framework to simulate a hierarchical containment environment.
Figure 19:
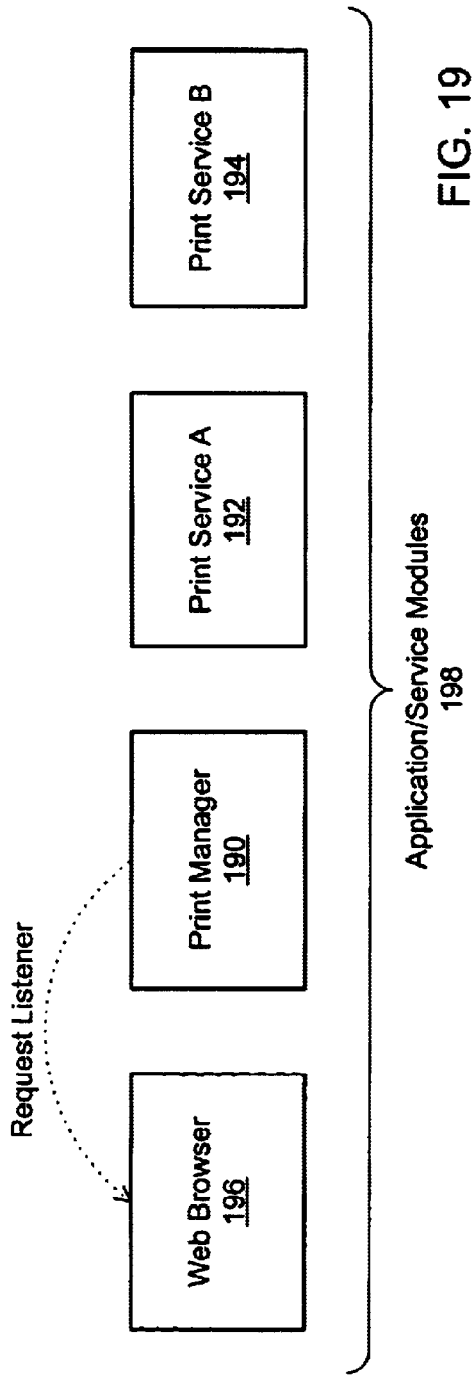

FIGS. 18 and 19—Simulating a Hierarchical Environment

It is often desirable to establish a hierarchical context for modules. For example, several service modules of the same type may be present in a system, but each may behave slightly differently. In a hierarchical containment system, a request by a module for a service may be filtered through a parent or containing module of the requesting module so that a reference to a specific service module may be passed back to the requestor. Hierarchical containment also has other inherent advantages, such as an ability to easily distribute and store data among a hierarchy of modules. However, as stated above, a full implementation of a hierarchical containment system may be very costly in terms of the system resources required, such as memory and processing power. The containment framework may provide a mechanism giving developers and applications many of the benefits of hierarchical containment, but without the high overhead costs usually associated with it.

For example, one embodiment of the containment framework allows modules to register themselves as module request listeners of other modules. For example, a module A may register itself as a request listener of a module B, e.g., by calling an AddRequestListener method of the central framework instance. When module B subsequently calls a method of the central framework instance to find a particular service, the central framework instance checks for any module request listeners for module B. In this case, it finds module A as a request listener, and asks module A to provide the requested service module to module B.

FIGS. 18 and 19 illustrate an exemplary use of module request listeners in the containment framework. FIG. 18 illustrates a desired conceptual module hierarchy for print services. As shown in the figure, two print service modules 192 and 194, print service A and print service B, are encapsulated in a print manager module 190. For example, the two print services 192 and 194 may print to different locations, have different resolution and color capabilities, etc. Either of these print service modules may satisfy a lookup request made by another module for a print service. However, it may be desirable to employ a print manager module which selects and returns a particular print service. For example the print manager 190 may select a print service based on which client module makes the print request, or the print manager may display a dialog box asking for user input for the desired print service characteristics.

Although the containment framework utilizes a non-hierarchical containment model, the hierarchy illustrated in FIG. 18 may be realized by registering the print manager module 190 as a module request listener of client modules that may request a print service. FIG. 19 illustrates example modules 198 which may run in a system. As described earlier, these modules may themselves employ other modules as services. According to the non-hierarchical model of the containment framework, the modules are shown arranged in a flat layout, with no inherent module hierarchy.

In this example, the web browser module 196 may be operable to make a print request, e.g., for printing a web page. As shown in FIG. 19, the print manager module 190 may be registered as a module request listener for the web browser module 196. Upon receiving the print service request from the web browser 196, the containment framework lookup service may find the print manager module 190 registered as a request listener for the web browser module 196 and may ask the print manager module 190 to provide a print service module to the web browser requestor 196. The print manager module 190 may then return a reference to print service module A 192 or print service module B 194, or the print manager module 190 may present a dialog box to the user to decide which print service module to return, etc. Thus, the desired module hierarchy of FIG. 18 may be implemented for non-hierarchical modules of the containment framework.

Figure 20:
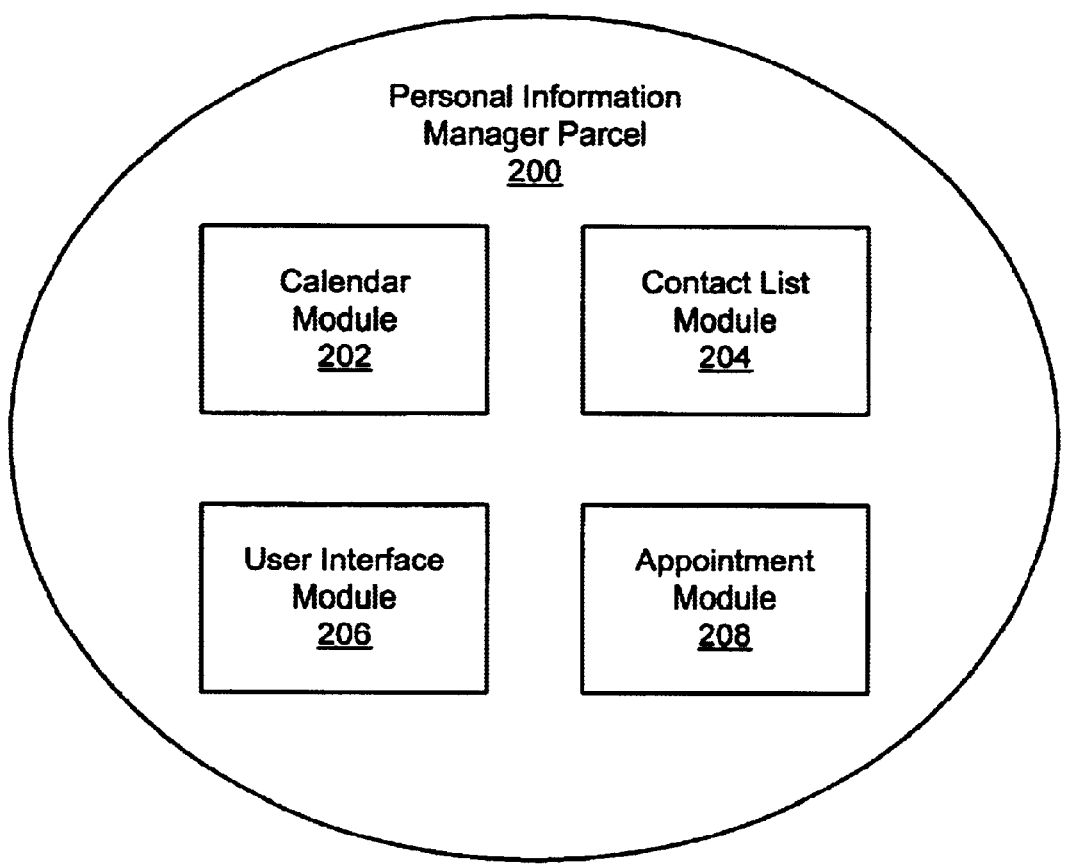
FIG. 20 illustrates the use of parcels to group modules together.

FIG. 20—Parcel Packaging Units

Modules may be packaged into units referred to as parcels. This packaging serves several purposes. For example, parcels provide a convenient mechanism to manage related code and data as a unit. If closely related modules have static dependencies, then they may be packaged together into a parcel. Parcels may be used to handle installation and upgrading within a system.

FIG. 20 illustrates an example parcel 200 that groups together modules related to a personal information manager (PIM). The figure shows a calendar module 202, a contact list module 204, an appointment module 208, and a user interface module 206. Various other modules may be present in the parcel as desired. The modules of the PIM parcel 200 may also make use of various core service modules running within the containment framework, such as bookmark services, find services, etc. The use of a PIM parcel may simplify installation and upgrading of a PIM application. Packaging the PIM modules into a parcel in this way also has the development-time benefit of creating separate code units for multi-target development.

Parcels also provide an additional way to provide a run-time context for non-hierarchical modules. When a module is loaded into the system, the central framework instance may store metadata specifying which parcel, if any, the module belongs to. Service modules may later use this information to provide services differently for different client modules, depending on which parcel the client belongs to. For example, client modules may use a file access service module to obtain a root directory. The file access module may return different root directories for different clients, depending on which parcels the clients belong to.

Figure 21:
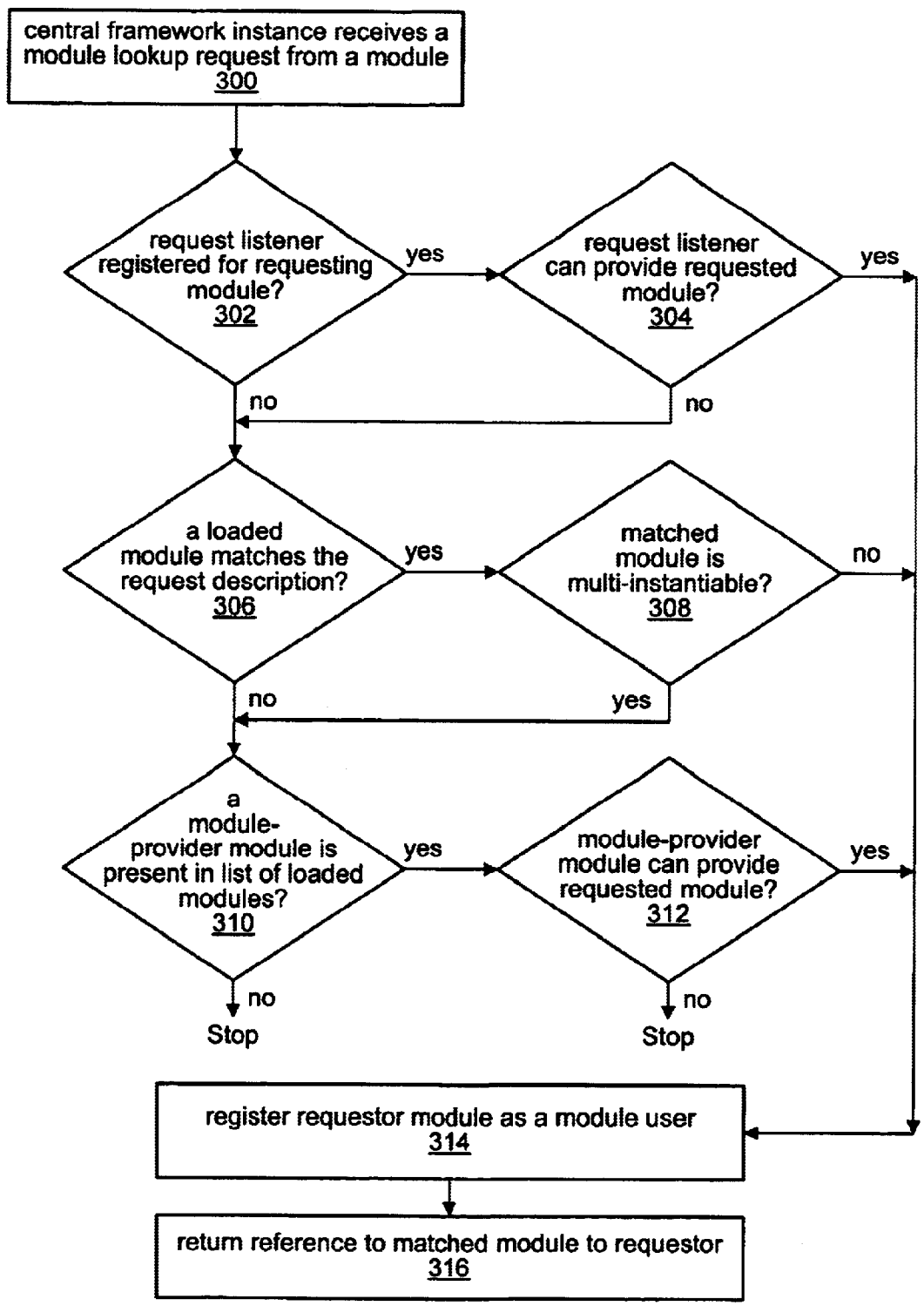
FIG. 21 is a flowchart diagram illustrating a typical lookup process that the central framework instance may perform when it receives a lookup request for a service module from a client module.

FIG. 21—Module Request Flowchart Diagram

FIG. 21 is a flowchart diagram illustrating a typical lookup process that the central framework instance may perform when it receives a lookup request for a service module from a client module. It is noted that FIG. 21 is exemplary and that various steps may be combined, omitted, or modified. For example, as noted previously, system modules may be added which customize the lookup process.

In step 300 of FIG. 21, the central framework instance receives a module lookup request from a requestor module. For example, the requestor module may call a RequestModule method of the central framework instance, passing a module descriptor for the service module being requested, as well as a reference to the requestor module itself The reference to the requestor module may be added to the system data so to keep track of service module users. As described in more detail below, a module may be unloaded when no other modules are using it.

The module descriptor passed by the requester module specifies various attributes about the requested module that the framework instance can use to attempt to find a matching module. This module descriptor may be an object which comprises information such as the requested module's service type, class name, and/or service-specific attributes, etc. The requestor may also pass a text description to the central framework instance, which the central framework instance may use to create a module descriptor object.

In step 302, the central framework instance checks to see whether any request listener modules are registered for the requesting module. If a request listener is found, then in step 304 the framework instance notifies the request listener of the request and instructs the request listener to attempt to provide a module which matches the module request descriptor. If the request listener can provide a matching module, then execution proceeds to step 314. Otherwise, other registered request listeners may be asked to provide a module, until a match is found or there are no more request listeners.

If no request listeners are found, or if no request listeners can provide the requested module, execution proceeds to step 306. However, in one embodiment, if one or more request listeners are registered for the requesting module, and none of them are able to provide a matching module, then execution may stop after step 304. In step 306, the central framework instance checks the list of modules to determine whether one of the modules matches the module descriptor. If a match is found, then in step 308 the framework instance checks whether the matched module is multi-instantiable. If not, then execution proceeds to step 314.

If the matched module is found to be multi-instantiable in step 308, then the central framework instance may continue to search through the module list for a match. If there are no more modules to search, execution proceeds to step 310. In step 310, the framework instance searches for module-provider modules in the module list. Module-provider modules are modules capable of providing a requested module. For example, a network lookup service may be imported as a module-provider module for the containment framework.

If a module-provider module is found, then in step 312, the central framework instance notifies the module-provider module of the request and instructs it to attempt to provide a module which matches the module request descriptor. If a match is found then execution proceeds to step 314. If the module provider cannot provide the requested module, the central framework instance may search for other module-provider modules and repeat step 312. If no module providers are present in the module list or if none can provide the requested module, then the requestor is notified that the request cannot be fulfilled, and execution completes.

Step 314 may be reached from step 304, 308, or 312. In all cases, a module is found which matches the module request descriptor. In step 314 the requester is registered as a user of the matched module, and in step 316 a reference to the matched module is returned to the requester. Any necessary initialization steps involved in loading and initializing the matched module are also performed in step 314. For example, modules may have an Initialize method that is called when a module is loaded.

As noted above, the flowchart of FIG. 21 is exemplary, and various embodiments may have different lookup/load scenarios. For example, a module may call a central framework method to load a service module without returning a reference to the matched module, or request listeners may be ignored in some cases, etc.

Figure 22:
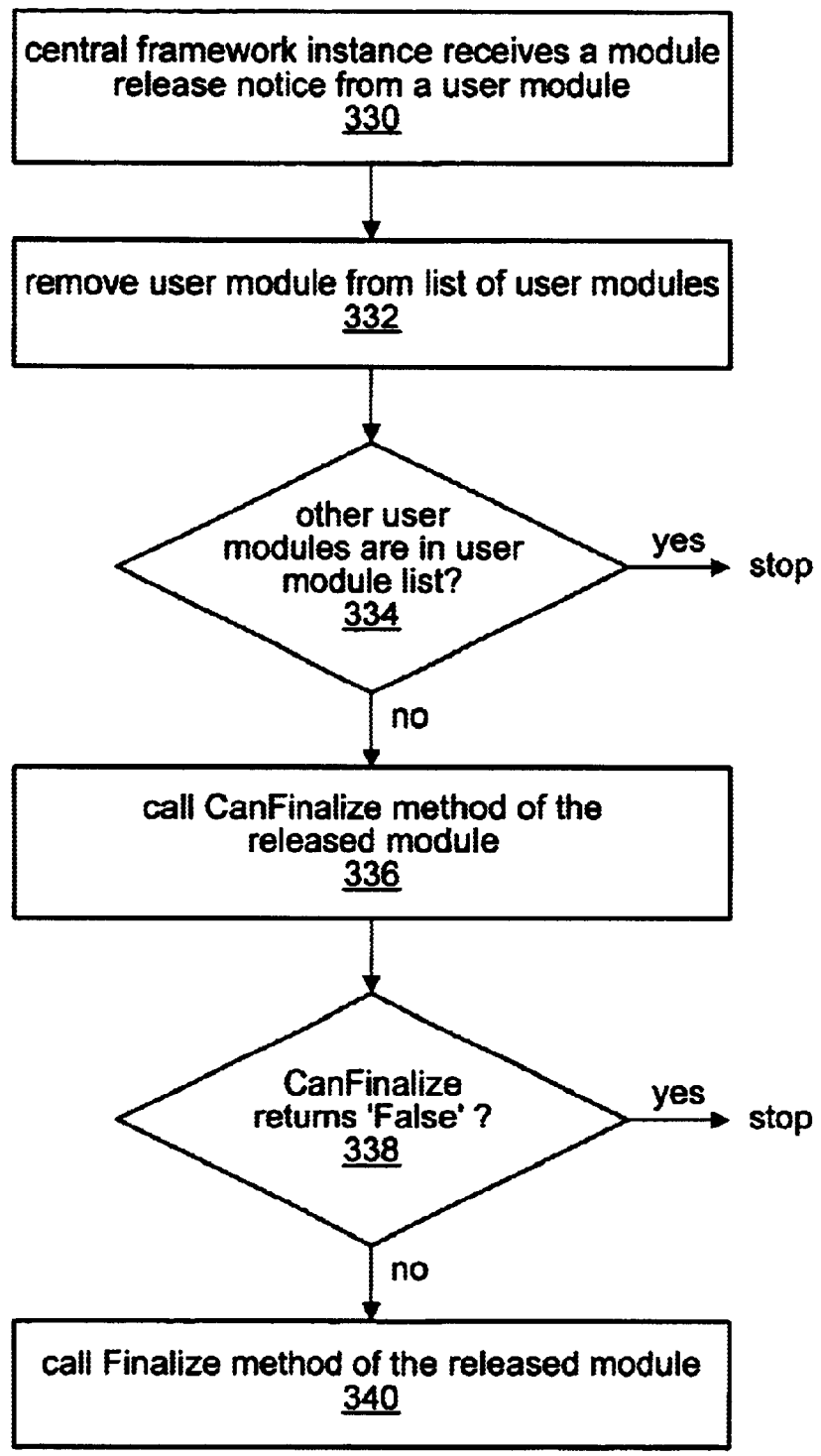
FIG. 22 is a flowchart diagram illustrating the module release process.

FIG. 22—Module Release Flowchart Diagram

When a client module is finished using a service module, the client may call a method of the central framework instance to release the module. FIG. 22 is a flowchart diagram illustrating the module release process. The flowchart of FIG. 22 is exemplary, and various steps may be combined, omitted, added, or modified as required or desired for different embodiments.

In step 330, the central framework instance receives a module-release notice from a user module. As described above for FIG. 21, when a user module requests a service module, the user module is added to a list of users of the service module. In step 332, the central framework instance removes the releasing user module from the list of users of the released module. In step 334, the framework instance determines whether any other user modules are using the released module, e.g., by checking whether other modules are present in the releases module's user module list. If so, then execution stops.

If no other modules are using the released module, the central framework instance may attempt to unload the released module. In step 336, the framework instance may call a CanFinalize method of the released module. The CanFinalize method returns true if the module can be unloaded, or false otherwise. If the CanFinalize method returns false in step 336, then execution stops. Otherwise, a Finalize method of the released module may be called. The Finalize method may perform any necessary steps for unloading the module, such as releasing resources. The module may then be unloaded, which may involve garbage-collection, etc., depending on the particular embodiment.

Although the present invention has been described in connection with specific embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for parsing a table, wherein the table comprises rows and columns, wherein the rows and columns define cells, the method comprising the steps of:

parsing each cell of the table a first time, wherein said first parsing of a cell comprises laying out a cell content in a first layout according to a maximum possible cell width and storing information regarding the resulting layout of the cell content;

calculating a maximum possible column width for each column, wherein said calculating a maximum possible column width utilizes said information stored in said first parsing;

calculating a minimum possible column width for each column;

assigning an actual width to each column;

parsing each cell of the table a second time, wherein said second parsing comprises laying out the content of the cells in a different layout according to actual cell widths, wherein said actual cell widths are determined by said actual widths assigned to corresponding columns; and assigning a height to each row.

2. The method of claim 1, wherein a cell of the table comprises a nested table, wherein said first parsing of the cell comprising a nested table comprises performing the method for the nested table, and wherein said second parsing of the cell comprising a nested table comprises performing an optimized version of the method for the nested table.

3. The method of claim 2, wherein said optimized version of the method eliminates:

said parsing each cell of the table a first time;

said calculating a maximum possible column width for each column; and said calculating a minimum possible column width for each column.

4. The method of claim 1, wherein cells may span multiple columns and cells may span multiple rows.

5. The method of claim 1, wherein said table is a table described by a markup language.

6. The method of claim 1, wherein said table is an HTML table.

7. A memory medium comprising computer program instructions for parsing a table, wherein the table comprises rows and columns, wherein the rows and columns define cells, wherein the computer program instructions are executable to implement:

- parsing each cell of the table a first time, wherein said first parsing of a cell comprises laying out a cell content in a first layout according to a maximum possible cell width and storing information regarding the resulting layout of the cell content;
- calculating a maximum possible column width for each column, wherein said calculating a maximum possible column width utilizes said information stored in said first parsing;
- calculating a minimum possible column width for each column;
- assigning an actual width to each column;
- parsing each cell of the table a second time, wherein said second parsing comprises laying out the content of the cells in a different layout according to actual cell widths, wherein said actual cell widths are determined by said actual widths assigned to corresponding columns; and
- assigning a height to each row.

8. The memory medium of claim 7, wherein a cell of the table comprises a nested table, wherein said first parsing of the cell comprising a nested table comprises performing the method for the nested table, and wherein said second parsing of the cell comprising a nested table comprises performing an optimized version of the method for the nested table.

9. The memory medium of claim 8, wherein said optimized version of the method eliminates:

- said parsing each cell of the table a first time;
- said calculating a maximum possible column width for each column; and
- said calculating a minimum possible column width for each column.

10. The memory medium of claim 7, wherein cells may span multiple columns and cells may span multiple rows.

11. The memory medium of claim 7, wherein said table is a table described by a markup language.

12. The memory medium of claim 7, wherein said table is an HTML table.

13. A small footprint device comprising a system memory, wherein the system memory stores a table and computer instructions, wherein said table comprises rows and columns, wherein the rows and columns define cells, and wherein said computer program instructions are executable to implement:

- parsing each cell of the table a first time, wherein said first parsing of a cell comprises laying out a cell content in a first layout according to a maximum possible cell width and storing information regarding the resulting layout of the cell content;
- calculating a maximum possible column width for each column, wherein said calculating a maximum possible column width utilizes said information stored in said first parsing;
- calculating a minimum possible column width for each column;
- assigning an actual width to each column;
- parsing each cell of the table a second time, wherein said second parsing comprises laying out the content of the cells in a different layout according to actual cell widths, wherein said actual cell widths are determined by said actual widths assigned to corresponding columns; and
- assigning a height to each row.

14. The small footprint device of claim 13, wherein a cell of the table comprises a nested table, wherein said first parsing of the cell comprising a nested table comprises performing the method for the nested table, and wherein said second parsing of the cell comprising a nested table comprises performing an optimized version of the method for the nested table.

15. The small footprint device of claim 14, wherein said optimized version of the method eliminates:

- said parsing each cell of the table a first time;
- said calculating a maximum possible column width for each column; and
- said calculating a minimum possible column width for each column.

16. The small footprint device of claim 13, wherein cells may span multiple columns and cells may span multiple rows.

17. The small footprint device of claim 13, wherein said table is a table described by a markup language.

18. The small footprint device of claim 13, wherein said table is an HTML table.

* * * * *